US011265776B2

(12) United States Patent
Teyeb et al.

(10) Patent No.: US 11,265,776 B2
(45) Date of Patent: Mar. 1, 2022

(54) MASTER NODE, A SECONDARY NODE AND METHODS PERFORMED THEREIN

(71) Applicant: Telefonaktiebolaget LM Ericsson (publ), Stockholm (SE)

(72) Inventors: Oumer Teyeb, Solna (SE); Stefan Wager, Espoo (FI); Osman Nuri Can Yilmaz, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/649,198

(22) PCT Filed: Oct. 8, 2018

(86) PCT No.: PCT/SE2018/051030
§ 371 (c)(1),
(2) Date: Mar. 20, 2020

(87) PCT Pub. No.: WO2019/074429
PCT Pub. Date: Apr. 18, 2019

(65) Prior Publication Data
US 2020/0296637 A1 Sep. 17, 2020

Related U.S. Application Data

(60) Provisional application No. 62/569,644, filed on Oct. 9, 2017.

(51) Int. Cl.
*H04W 4/00* (2018.01)
*H04W 36/00* (2009.01)

(52) U.S. Cl.
CPC .............. *H04W 36/0069* (2018.08)

(58) Field of Classification Search
CPC .............. H04W 4/20; H04W 36/0005; H04W 36/0055; H04W 36/0069; H04W 36/0083
See application file for complete search history.

(56) References Cited

U.S. PATENT DOCUMENTS

2011/0263222 A1* 10/2011 Farnsworth ............. H04L 63/12
455/410
2012/0129526 A1* 5/2012 Muhanna ............... H04W 76/28
455/436

(Continued)

FOREIGN PATENT DOCUMENTS

WO 2016163059 A1 10/2016

OTHER PUBLICATIONS

Unknown, Author, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.0.0, Jun. 2016, pp. 1-254.

(Continued)

*Primary Examiner* — Matthew W Genack
(74) *Attorney, Agent, or Firm* — Christopher & Weisberg, P.A.

(57) ABSTRACT

Embodiments herein relate e.g. to a method performed by a master node (QQ160) for handling communication of a wireless device (QQ110) in a wireless network. The master node (QQ160) transmits, to a secondary node, SN, a message before initiating a SN change procedure, which message indicates that an SN change is pending and as such the SN should not perform either a secondary cell group, SCG, reconfiguration or trigger any SN triggered procedures.

18 Claims, 20 Drawing Sheets

(56) References Cited

U.S. PATENT DOCUMENTS

| | | | | |
|---|---|---|---|---|
| 2016/0044744 A1* | 2/2016 | Lee | ................... | H04W 76/38 370/329 |
| 2016/0157219 A1 | 6/2016 | Uemura et al. | | |
| 2018/0368029 A1* | 12/2018 | Wu | ................... | H04W 24/10 |

OTHER PUBLICATIONS

Unknown, Author, "3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V1.0.0, Sep. 2017, pp. 1-44.

Unknown, Author, "3rd Generation Partnership Project; Technical Specification Group Radio Access Network; New Generation Radio Access Network; User Equipment (UE) procedures in Idle mode (Release 15)", 3GPP TS 38.304 v1.0.0.3, May 2017, pp. 1-12.

Unknown, Author, "Interaction of SeNB and MeNB initiated SeNB Modification procedure", 3GPP TSG-RAN WG3 Meeting #86; R3-143042; San Francisco, CA, U.S., Nov. 17-21, 2014, pp. 1-13.

\* cited by examiner

VV02
Transmit a message before initiating a SN change procedure, which message indicates that an SN change is pending and as such the SN should not perform either a SCG reconfiguration or trigger any SN triggered procedures.

FIG. 20

MASTER NODE, A SECONDARY NODE AND METHODS PERFORMED THEREIN

TECHNICAL FIELD

Embodiments herein relate to a master node, a secondary node and methods performed therein for communication. In particular embodiments herein relate handle communication for a wireless device in a wireless network, which wireless network provides e.g. dual connectivity (DC).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In LTE, the Radio Resource Control (RRC) protocol is used to configure/setup and maintain the radio connection between a user equipment (UE) and a network node such as an evolved NodeB (eNB). When the UE receives an RRC message from the eNB, it will apply the configuration (we also use the term "compile" to refer to the application of the configuration), and if this succeeds the UE generates an RRC complete message that indicates a transaction identity (ID) of the RRC message that triggered this response.

Since LTE-release 8, three Signaling Radio Bearers (SRBs), namely SRB0, SRB1 and SRB2 have been available for the transport of RRC and Non Access Stratum (NAS) messages between the UE and eNB. A new SRB, known as SRB1bis, was also introduced in rel-13 for supporting Data Over NAS (DoNAS) in Narrowband-Internet of things (NB-IoT).

SRB0 is for RRC messages using a Common Control Channel (CCCH) logical channel, and it is used for handling RRC connection setup, RRC connection resume and RRC connection re-establishment. Once the UE is connected to the eNB, i.e. RRC connection setup or RRC connection reestablishment/resume has succeeded, SRB1 is used for handling RRC messages, which may include a piggybacked NAS message, as well as for NAS messages prior to the establishment of SRB2, all using a Dedicated Control Channel (DCCH) logical channel.

SRB2 is for RRC messages which include logged measurement information as well as for NAS messages, all using DCCH logical channel. SRB2 has a lower priority than SRB1, because logged measurement information and NAS messages may be lengthy and may cause the blocking of more urgent and smaller SRB1 messages.

SRB2 is always configured by Evolved-UMTS Terrestrial Radio Access Network (E-UTRAN) after security activation.

E-UTRAN supports Dual Connectivity (DC) operation whereby a multiple Reception/Transmission (Rx/Tx) UE in RRC_CONNECTED mode is configured to utilize radio resources provided by two distinct schedulers, located in two eNBs, i.e. radio base stations, connected via a non-ideal backhaul over the X2 interface, see 3GPP 36.300 v.13.0.0. "Non-ideal backhaul" implies that the transport of messages over the X2 interface between the network nodes may be subject to both packet delays and losses.

eNBs involved in DC for a certain UE may assume two different roles: an eNB may either act as a Master Node (MN), also referred to as Master eNB (MeNB), or as a Secondary Node (SN), also referred to as Secondary eNB (SeNB). In DC a UE is connected to one MN and one SN.

In LTE DC, the radio protocol architecture that a particular bearer uses depends on how the bearer is setup. Three bearer types exist: Master Cell Group (MCG) bearer, Secondary Cell Group (SCG) bearer and split bearers. RRC is located in the MN and SRBs are always configured as MCG bearer type and therefore only use the radio resources of the MN. When a node acts as an SN, the LTE DC solution does not have any UE RRC context of that UE and all such signaling is handled by the MN. FIG. 1 shows a LTE DC User Plane (UP) architecture.

In 3GPP, a study item on a new radio interface for 5G has recently been completed and 3GPP has now continued with the effort to standardize this new radio interface, often abbreviated by New Radio (NR). LTE-NR DC, also referred to as LTE-NR tight interworking, is currently being discussed for rel-15.

In this context, the major changes from LTE DC are
The introduction of a split bearer from the SN, known as SCG split bearer. The SN in this case is also referred to as secondary gNB (SgNB), where gNB denotes an NR base station.
The introduction of split bearers for RRC.
The introduction of a direct RRC from the SN, known as SCG SRB or direct SRB.

FIGS. 2 to 4 show the User Plane (UP) and Control Plane (CP) architectures for LTE-NR tight interworking.

It should be appreciated that embodiments herein apply to different scenarios where the MN and SN nodes can apply various radio interface technologies. The MN node can apply e.g. LTE or NR, and the SN node can also use either LTE or NR without departing from the main concept of embodiments herein. Other technologies could also be used over the radio interface. The 3GPP technical report TR 38.304 v.0.0.3 includes various scenarios and combinations where the MN and SN are applying either NR, LTE or both.

For the first phase of 5G standardization and 5G deployment, the most likely scenario is that MN will apply LTE, and the SN will apply the new radio interface, denoted NR, currently being under standardization. Thus, we focus on this scenario and use the term MeNB and SgNB for the rest of this description.

The following terminologies are used throughout this text to differentiate different dual connectivity scenarios:
DC: LTE DC, i.e. both MN and SN employ LTE.
EN-DC: LTE-NR dual connectivity where LTE is the master and NR is the secondary.
NE-DC: LTE-NR dual connectivity where NR is the master and LTE is the secondary.
NR-DC (or NR-NR DC): both MN and SN employ NR.
Multi-RAT DC (MR-DC): a generic term to describe where the MN and SN employ different RATs, EN-DC and NE-DC are two different example cases of MR-DC.

As already mentioned above, the DC approach introduced for 5G standardization includes a solution for split bearers for SRBs, see FIGS. 3 and 4. The intent of introducing such "RRC diversity" is to enable e.g. better mobility robustness and improved message delivery between the infrastructure and the UE. For example, it is then possible to send a handover message or any other reconfiguration message over the best link, even if one of either the link or links to the MeNB (or SgNB) has deteriorated significantly. It is also possible to send duplicates of the same message over both MeNB and SgNB to achieve a better success-rate and faster delivery of the concerned message; in case the links are error prone. Such benefits of "RRC diversity" are not available in the current LTE DC solution, and 3GPP has therefore undertaken the challenge to enable such RRC diversity. Having RRC diversity may prove particularly important for ultra-reliable connections with low latency, often called Ultra Reliable Low Latency Communication (URLLC).

As can be seen in FIG. 4, RRC messages generated and/or transmitted from the MN can be sent either via the MeNB, or relayed over an X2 interface to the SgNB. The messages received over the different paths in the UE are then combined to the LTE Packet Data Convergence Protocol (PDCP) and then forwarded to the LTE RRC receiving entity and processed further. In the uplink, the UE generates LTE RRC messages that the UE may transmit either over the NR radio interface towards the SgNB or via the MN node using LTE technology. Messages received in the SgNB are then forwarded over an X2 interface towards the MeNB node.

One of the main reasons behind the introduction of SCG SRB between the UE and SN is that there may be SCG reconfiguration scenarios where SN can configure the UE directly without the need for coordination with the MN. This is for cases such as intra-SN mobility, measurement configurations/reporting related to the intra-SN cells, etc. Intra-SN meaning within SNs. Thus, it has been agreed in 3GPP that SCG SRB will support a (subset) of the functionalities, namely: RRCConnectionReconfiguration, in the DL; and RRCConnectionReconfigurationComplete and MeasurementReport in the UL.

Another control signaling mechanism, in addition to SCG SRB and split SRBs, in LTE-NR tight interworking is using embedded RRC and is also illustrated in FIG. 4. Embedded RRC is employed for two cases:
1. When SCG SRB is not available.
2. The UE has to be configured with settings that affect both the NR and LTE legs, i.e. co-ordination is required, even if direct SRB is available.

For the first case, the SgNB sends the RRC message to the MeNB via the X2 interface, which the MeNB then embeds in its own RRC message and sends via SRB1, which could be split or not. The UE then extracts the embedded NR RRC message from the container MeNB RRC message and apply the configurations on the NR leg. In the UL direction, the UE embeds the NR RRC messages in an LTE RRC message towards the MeNB, and the MeNB will extract the embedded NR RRC message from this and forwards it to the SgNB.

For the second case, i.e. messages/configurations that require co-ordination between the MeNB and SgNB, e.g. inter(between different)-RAT measurement configurations, settings affecting buffer sizes which the UE has to allocate to the NR and LTE legs without exceeding the total buffering capability of the UE, etc.), the MeNB node can send the NR configurations, the MeNB and SgNB can negotiate the final configurations (since it affects the settings of both legs), and the final configuration for the NR leg is sent to the UE via an LTE RRC message that contains the embedded NR RRC message, wherein the final embedded NR RRC message still being generated by the SN.

The MN initiated SN change procedure is described in TS 37.340 and shown in FIG. 5.

The procedure steps are.
1/2. The MN initiates the change of SN by requesting the target SN to allocate resources for the UE by means of the SgNB Addition procedure. The MN may include measurement results related to the target SN. If forwarding is needed, the target SN provides forwarding addresses to the MN.
3. If the allocation of target SN resources was successful, the MN initiates the release of the source SN resources. If data forwarding is needed the MN provides data forwarding addresses to the source SN. Either direct data forwarding or indirect data forwarding is used for SCG bearer and SCG split bearer. Only indirect data forwarding is used for MCG Split bearer. Reception of the SgNB Release Request message triggers the source SN to stop providing user data to the UE and, if applicable, to start data forwarding.
4/5. The MN triggers the UE to apply the new configuration. The MN indicates to the UE the new configuration in the RRCConnectionReconfiguration message including the NR RRC configuration message generated by the target SN. The UE applies the new configuration and sends the RRCConnectionReconfigurationComplete message, including the encoded NR RRC response message for the target SN. In case the UE is unable to comply with (part of) the configuration included in the RRCConnectionReconfiguration message, it performs the reconfiguration failure procedure.
6. If the RRC connection reconfiguration procedure was successful, the MN informs the target SN via SgNBReconfigurationComplete message with the encoded NR RRC response message for the target SN.
7. The UE synchronizes to the target SN.
8/9. If applicable, data forwarding from the source SN takes place. It may be initiated as early as the source SN receives the SgNB Release Request message from the MN.
10-14. If one of the bearer contexts was configured with the SCG or SCG split bearer option at the source SN, path update is triggered by the MN.
15. Upon reception of the UE Context Release message, the source SN can release radio and C-plane related resource associated to the UE context. Any ongoing data forwarding may continue.

It should be noted that, in message 1 (SgNB addition request), the MN includes the current SCG configuration of the UE so that the target SN (T-SN) is able to do delta configuration instead of full configuration (i.e. it can change only the configuration that needs to be change, instead of reconfiguring the whole SCG). Currently, the exact details on how the MN acquires the latest SCG configuration is not settled in 3GPP. However, two possible ways have been identified:
a) Whenever the SN modifies the SCG configuration (e.g. directly via SCG SRB), it notifies the MN about it
b) The MN can explicitly request the latest SCG configuration from the MN at any time For the MN initiated SN change procedure discussed above, we assume that before message 1 is sent, the MN may acquire the current SCG configuration of the UE by using either method a or b. So the assumption is that before message 1, the MN has acquired the current SCG configuration of the UE.

There currently exist certain challenge(s). In the MN initiated SN change procedure, the Source SN (S-SN) is not aware of the SN change procedure until it receives the release message in step 3.

It is possible that the S-SN might modify the SCG configuration of the UE during the time the MN is adding the target T-SN (i.e. messages 1 and 2). Thus, a situation like this might arise:
- the MN includes SCGConfiguration_version1 in message 1 towards the T-SN, and the T-SN applies a delta configuration over that, which is then communicated via message 2 and subsequently towards the UE in message 4
- While this is happening, the SN has changed the SCG-Configuration of the UE to SCGConfiguration_version2
- The UE tries to apply the delta configuration received in message 4 on top of SCGConfiguration_version2
  - a conflict/error/failure happens e.g., RRC connection reconfiguration failure or SCG failure, and UE performs re-establishment or SCG failure reporting; or
  - UE is able to apply the delta configuration, but since the T-SN is assuming the UE to have SCGConfiguration_version1+delta, while UE actually has the configuration SCGConfiguraiton_version2+delta. As such, eventually, an error or unwanted behavior is likely to occur because the SN is assuming one configuration, while the UE is having another configuration Though the above scenario is more likely to happen in case the SN was using SCG SRB, i.e. with the MN having no idea regarding the SCG configuration change, it could even happen in the case of embedded SRB utilization because if co-ordination is not required, the SN's SCG reconfiguration is transported to the UE completely transparently by the MN.

SUMMARY

Certain aspects of the present disclosure and their embodiments may provide solutions to the above mentioned or other challenges. Embodiments introduce mechanisms to ensure that a race condition will not happen during MN initiated SN change procedure in e.g. EN-DC. This is achieved by making sure that the SN is aware of ongoing MN initiated SN change, so that SN can avoid modifying the SCG configuration during this time.

There are, proposed herein, various embodiments which address one or more of the issues disclosed herein. According to an aspect of embodiments herein a method performed by a master node for handling communication of a wireless device in a wireless network is herein provided. The master node transmits, to a secondary node (SN), a message before initiating a SN change procedure, which message indicates that an SN change is pending and as such the SN should not perform either a SCG reconfiguration or trigger any SN triggered procedures.

According to another aspect of embodiments herein a method performed by a secondary node for handling communication of a wireless device in a wireless network is herein provided. The secondary node receives the message from a master node or another SN, which message indicates that an SN change is pending and as such the SN should not perform either a SCG reconfiguration or trigger any SN triggered procedures. Upon receiving the message the secondary node refrains from performing a SCG reconfiguration or initiating SN triggered procedures.

Also, a master node for handling communication of a wireless device in a wireless network is herein provided. The master node is configured to transmit, to a SN, a message before initiating a SN change procedure, which message indicates that an SN change is pending and as such the SN should not perform either a SCG reconfiguration or trigger any SN triggered procedures.

Furthermore, a SN for handling communication of a wireless device in a wireless network is herein provided. The SN is configured to receive a message from a master node or another SN, wherein the message indicates that a SN change is pending and as such the SN should not perform either a SCG reconfiguration or trigger any SN triggered procedures. The SN is further configured to, upon receiving the message, refrain from performing a SCG reconfiguration or initiating SN triggered procedures.

Certain embodiments may provide one or more of the following technical advantage(s). Embodiments ensure that MN triggered SN change will not result in race conditions where the SCG configuration of the wireless device is different at the target SN and the wireless device since the secondary node (source), upon reception of the message, refrains from performing a SCG reconfiguration or initiating SN triggered procedures.

BRIEF DESCRIPTION OF THE DRAWINGS

Embodiments will now be described in more detail in relation to the enclosed drawings, in which:

FIG. 20 is a block diagram depicting a method performed by the master node according to some embodiments herein;

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

It should be noted:

Even though it is herein a focus on the LTE-NR tight interworking case where the LTE is the master node (referred to as EN-DC), embodiments are also applicable to other DC cases such as NR-LTE DC where NR is the master and LTE is the secondary node (referred to as NE-DC).

LTE and NR are the RATs that are covered in the description herein. However, the main idea of embodiments herein can be applicable to any aggregation scenario where the MN and SN apply different cellular/wireless RATs.

We are referring to the interface between the MN and SN as X2, based on the current interface definitions in LTE. For LTE-NR interworking and NR-NR interworking cases, the exact name for such an interface could end up being different (e.g. Xn instead of X2, with the corresponding XnAP protocol instead of X2AP). However, that will not impact the applicability of embodiments herein.

In all the embodiments, we focused on SCG reconfiguration messages, but the embodiments are equally applicable to any RRC messages communicated between the SN and the UE, either via embedded RRC of the MN, or directly via the SCG SRB.

According to embodiments herein a MN, before initiating an SN change procedure, sends a message to a source (S)-SN, indicating that an SN change is pending and as such the SN should not perform either a SCG reconfiguration or trigger any procedures such as SN initiated SCG change/release.

Figure 1:
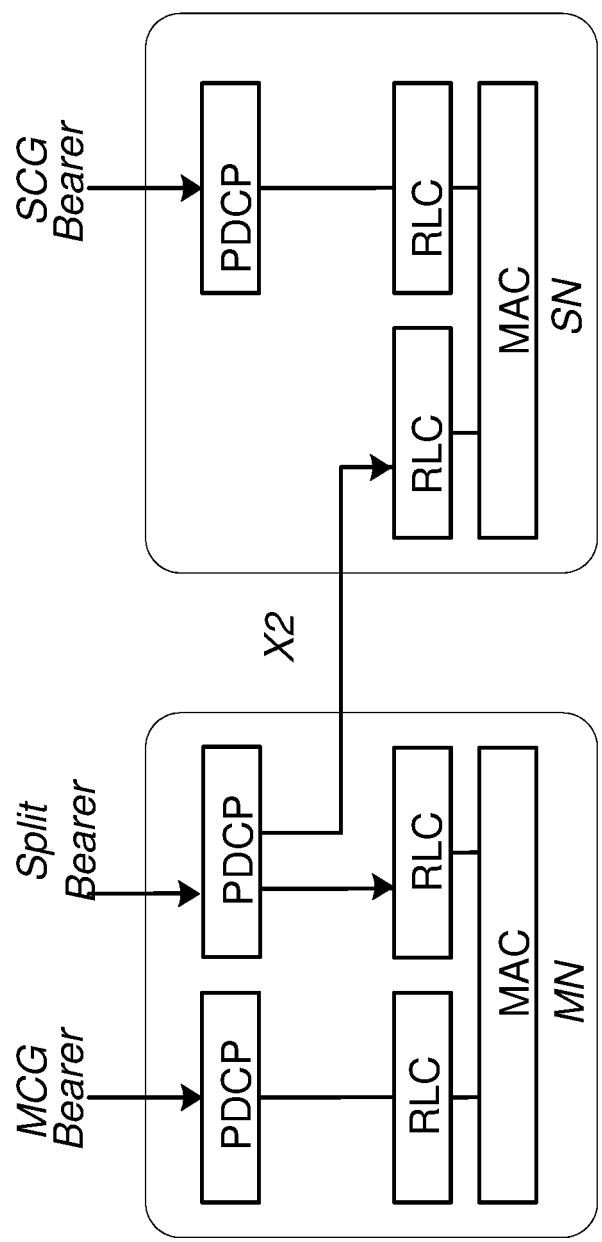
FIG. 1 shows a LTE DC User Plane (UP) architecture.
Figure 2:
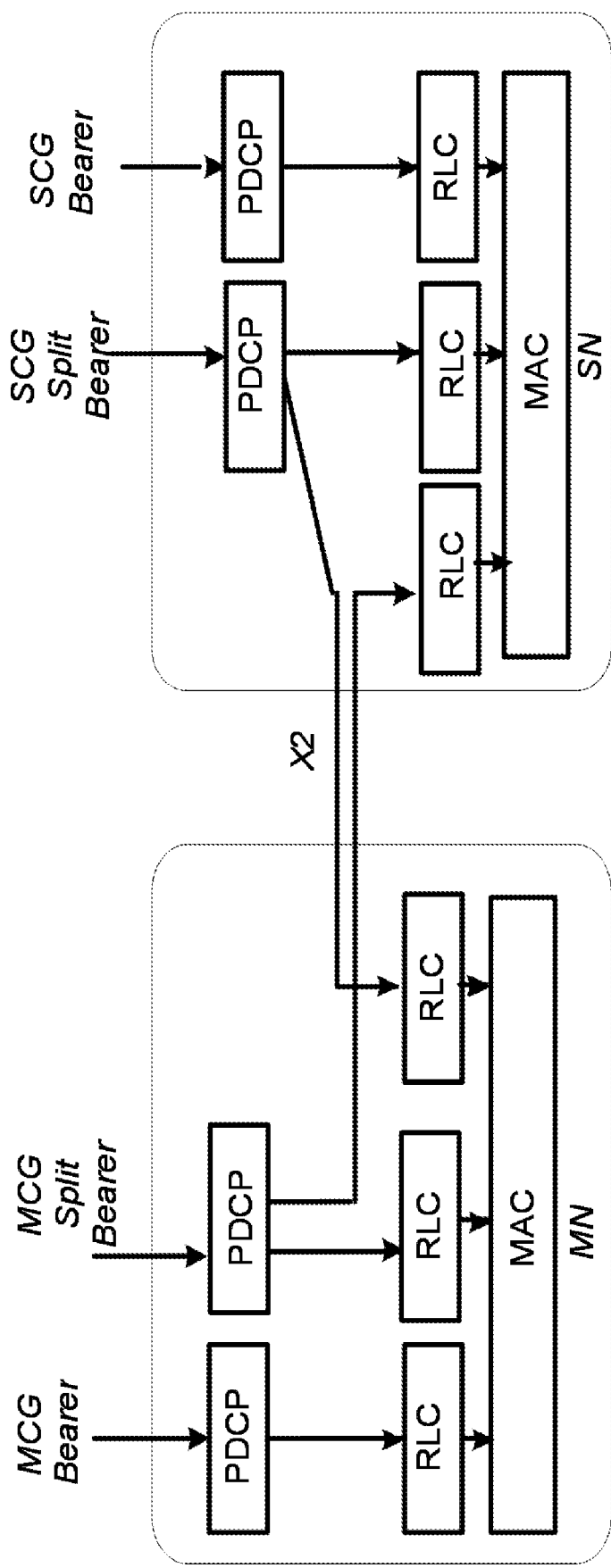
FIG. 2 shows User Plane (UP) and Control Plane (CP) architectures for LTE-NR tight interworking.
Figure 3:
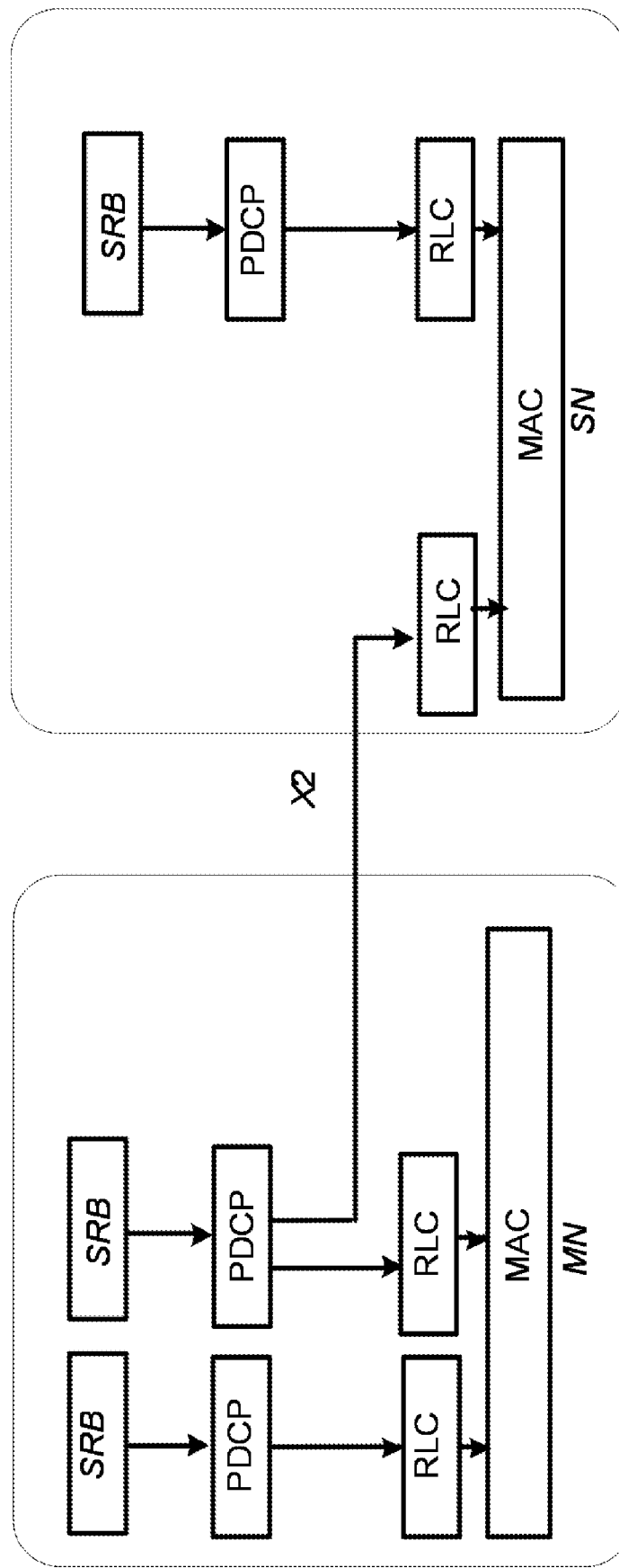
FIG. 3 shows User Plane (UP) and Control Plane (CP) architectures for LTE-NR tight interworking.
Figure 4:
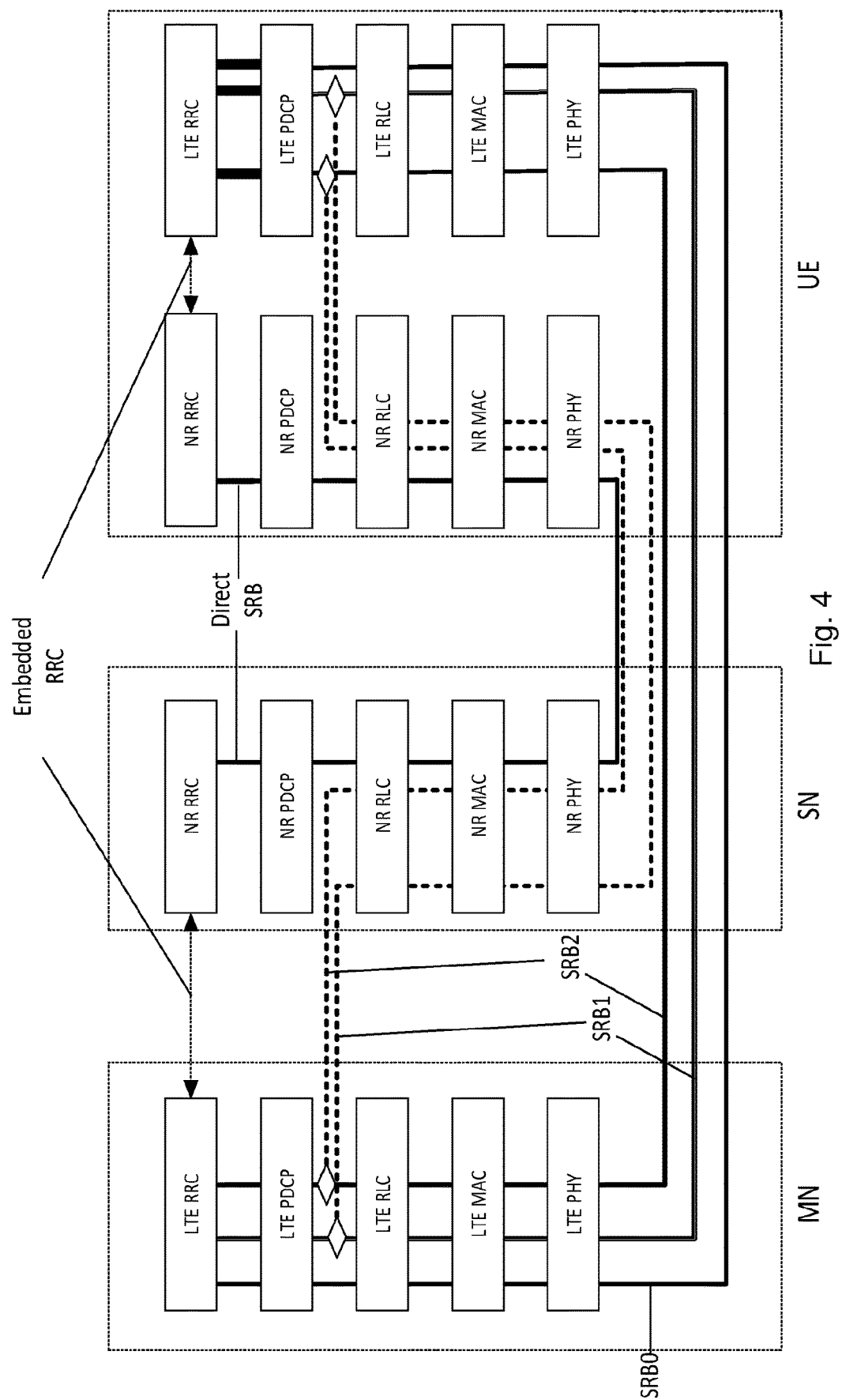
FIG. 4 shows User Plane (UP) and Control Plane (CP) architectures for LTE-NR tight interworking.
Figure 5:
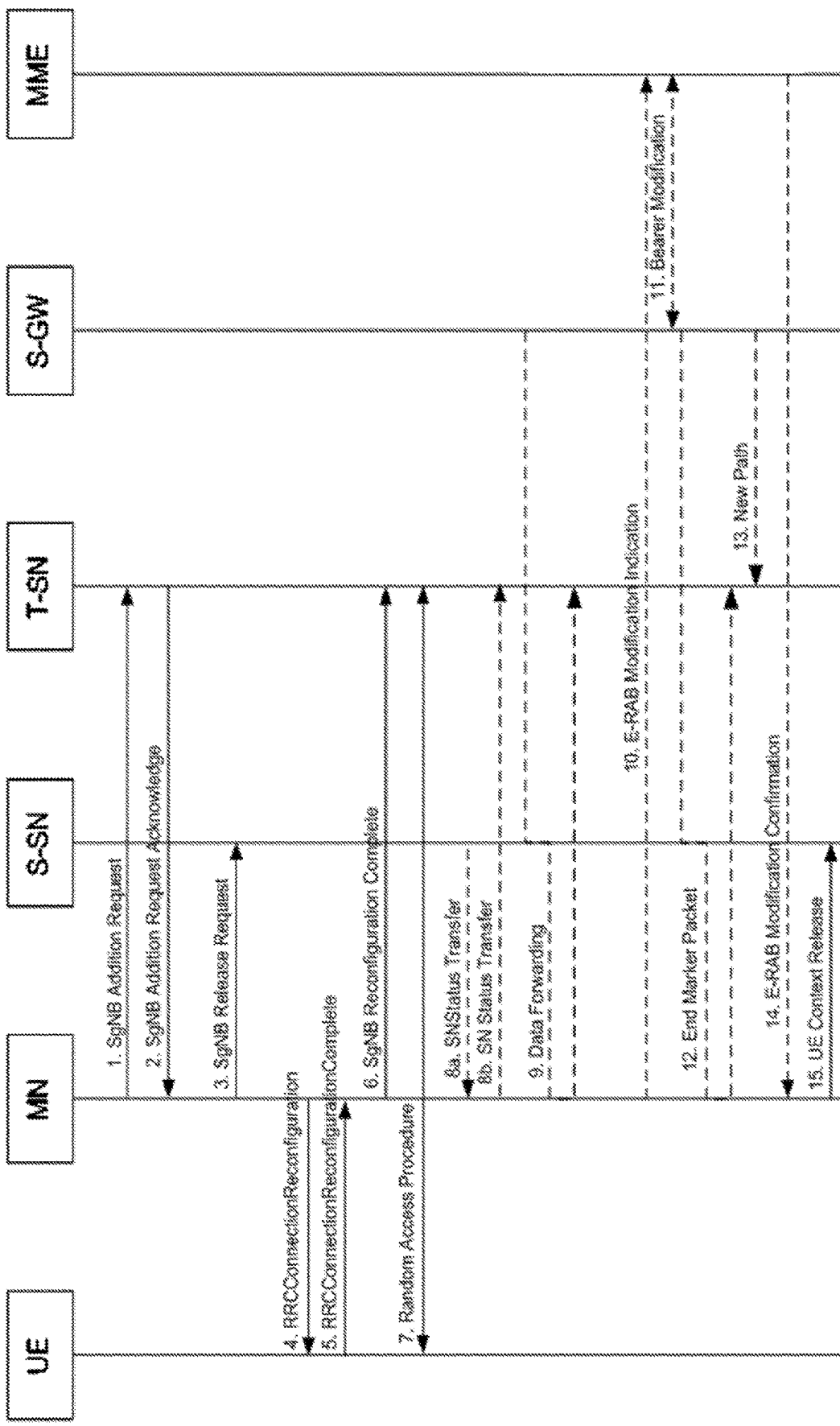
FIG. 5 shows a MN initiated SN change procedure.
Figure 6:
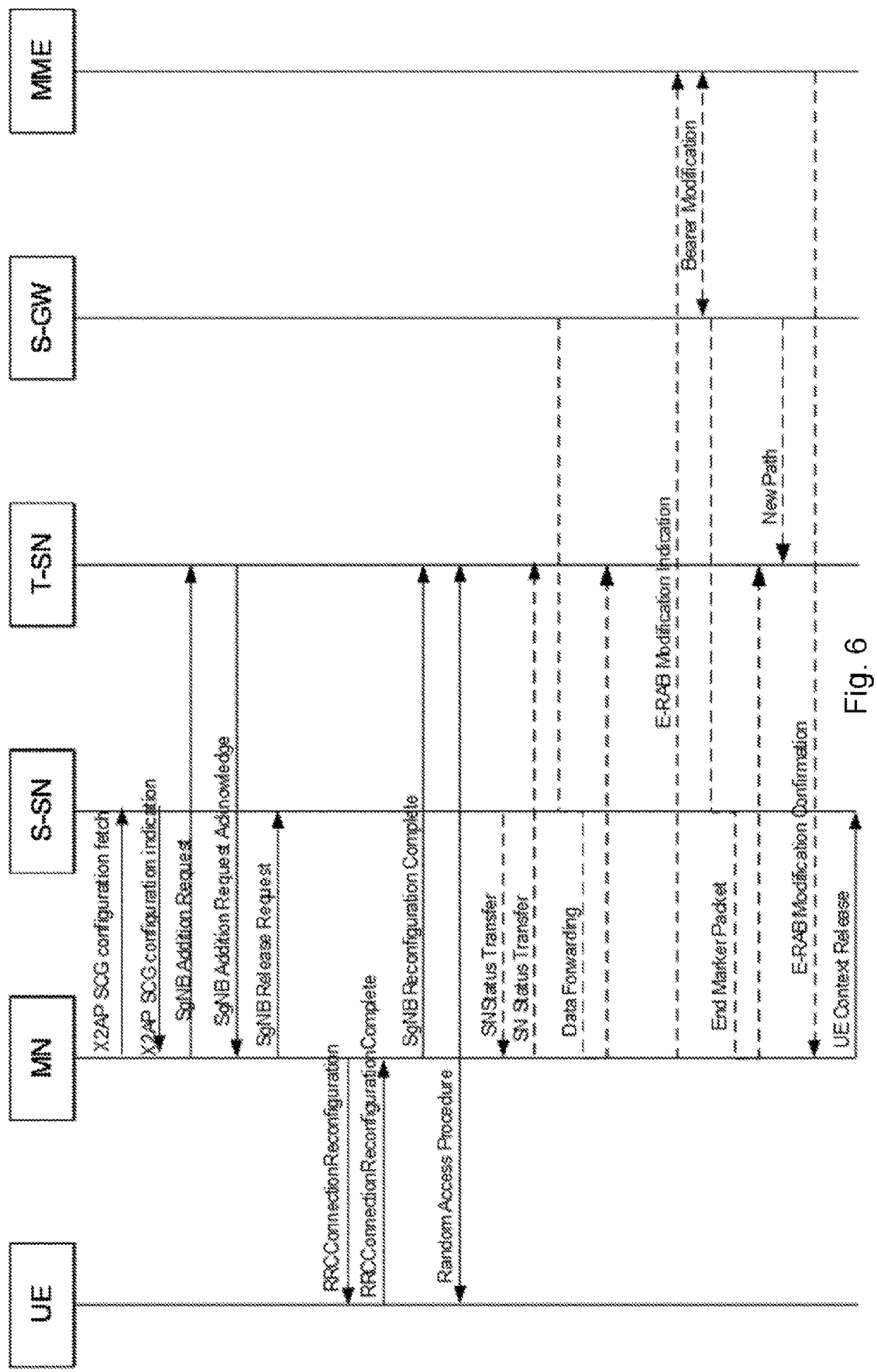
FIG. 6 shows a way of transmitting the message according to embodiments herein.

The message may be a new message introduced in X2AP, exemplified in FIG. 6. The message may be an enhanced version of an X2AP SCG configuration fetch or retrieve message, where a new flag is introduced, e.g. a Boolean type, where true means "Pause", while a false or the not inclusion of this message means "continue as before". Here, X2AP SCG configuration fetch/retrieve message is used for requesting the latest SCG connection reconfiguration from the S-SN and another message receiving it back from S-SN respectively. See FIG. 6. The message may be the X2AP SCG configuration fetch/retrieve message, where the message implicitly indicates for the SN to "pause" SCG reconfigurations or triggering of new procedures. FIG. 6 shows the procedure steps wherein:

According to embodiments herein the MN sends the message being an X2AP SCG configuration fetch message to the source (S)-SN and the S-SN responds with an X2AP SCG configuration indication back to the MN.

The MN initiates the change of SN by requesting the target (T)-SN to allocate resources for the UE by means of the SgNB Addition procedure. The MN may include measurement results related to the target SN. If forwarding is needed, the target SN provides forwarding addresses to the MN.

If the allocation of target SN resources was successful, the MN initiates the release of the source SN resources. If data forwarding is needed the MN provides data forwarding addresses to the source SN. Either direct data forwarding or indirect data forwarding is used for SCG bearer and SCG split bearer. Only indirect data forwarding is used for MCG Split bearer. Reception of the SgNB Release Request message triggers the source SN to stop providing user data to the UE and, if applicable, to start data forwarding.

The MN triggers the UE to apply the new configuration. The MN indicates to the UE the new configuration in the RRCConnectionReconfiguration message including the NR RRC configuration message generated by the target SN. The UE applies the new configuration and sends the RRCConnectionReconfigurationComplete message, including the encoded NR RRC response message for the target SN. In case the UE is unable to comply with (part of) the configuration included in the RRCConnectionReconfiguration message, it performs the reconfiguration failure procedure.

If the RRC connection reconfiguration procedure was successful, the MN informs the target SN via SgNBReconfigurationComplete message with the encoded NR RRC response message for the target SN.

The UE synchronizes to the target SN.

If applicable, data forwarding from the source SN takes place. It may be initiated as early as the source SN receives the SgNB Release Request message from the MN.

If one of the bearer contexts was configured with the SCG or SCG split bearer option at the source SN, path update is triggered by the MN.

Upon reception of the UE Context Release message, the source SN can release radio and C-plane related resource associated to the UE context. Any ongoing data forwarding may continue.

The MN may pause the transmission of any pending SN messages that were supposed to or being transmitted via embedded SRB, and the messages may be saved in a buffer.

Figure 7:
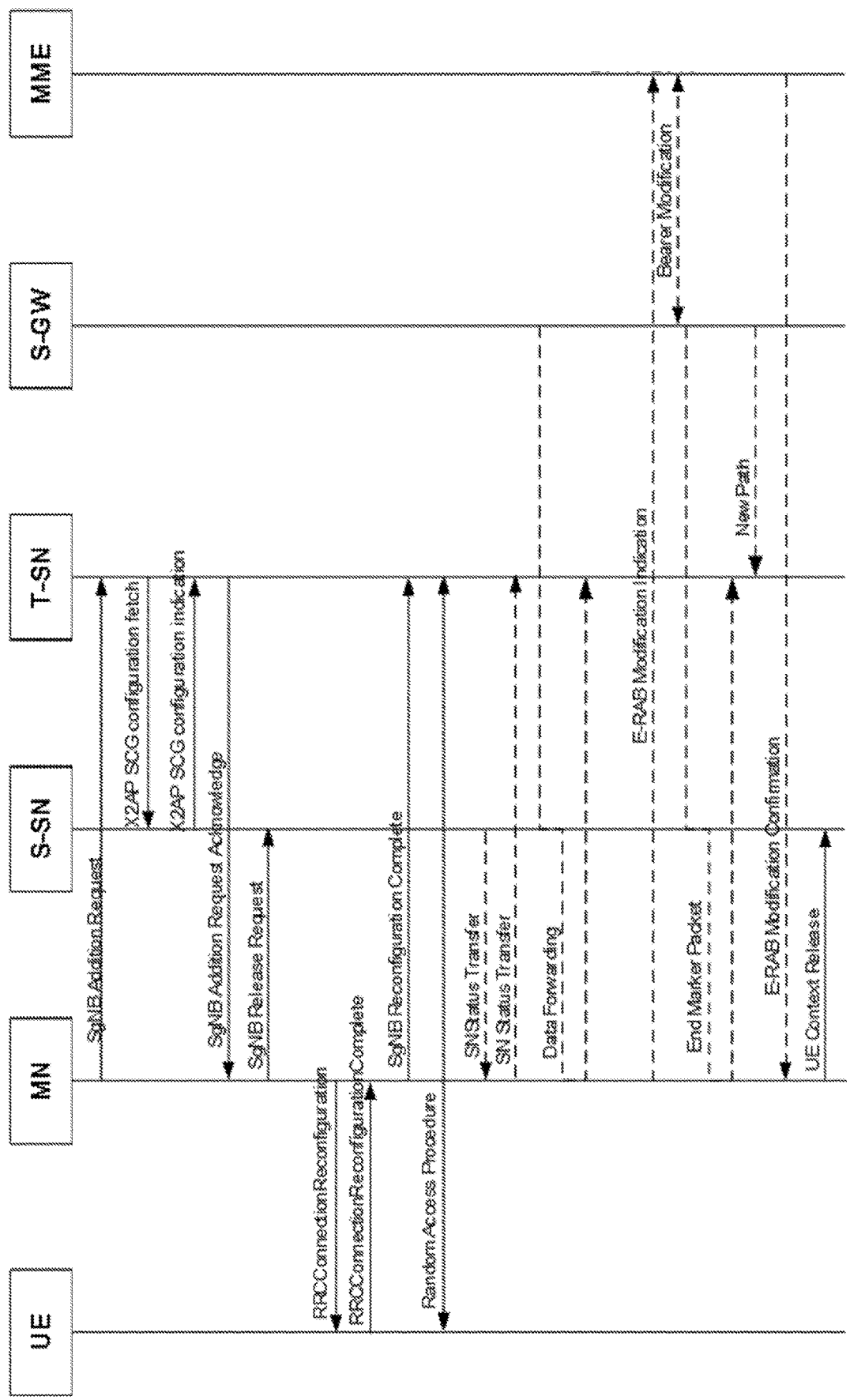
FIG. 7 shows a way of transmitting the message according to embodiments herein.

The MN, upon initiating the SgNB addition request to a target (T)-SN, may include the identification of the S-SN as well as the UE ID, e.g. X2AP ID, in the request. The T-SN, upon getting the SgNB addition requesting from the MN, may identify the S-SN from the SgNB addition request, and may send a message requesting of the latest SCG configuration of the UE from the S-SN. As a response to this message S-SN sends the latest SCG configuration to T-SN directly or via MN. See FIG. 7 illustrating the example for when the case configuration is sent directly from S-SN to T-SN.

The MN initiates the change of SN by requesting the target (T)-SN to allocate resources for the UE by means of the SgNB Addition procedure i.e. transmitting a SgNB Addition Request being an example of the message according to embodiments herein. The MN may include measurement results related to the target SN. The T-SN may then send the X2AP SCG configuration fetch message, which is also an example of the message according to embodiments herein, to the source (S)-SN and the S-SN responds with an X2AP SCG configuration indication back to the T-SN according to some embodiments herein. If forwarding is needed, the target SN provides forwarding addresses to the MN.

If the allocation of target SN resources was successful, the MN initiates the release of the source SN resources. If data forwarding is needed the MN provides data forwarding addresses to the source SN. Either direct data forwarding or indirect data forwarding is used for SCG bearer and SCG split bearer. Only indirect data forwarding is used for MCG Split bearer. Reception of the SgNB Release Request message triggers the source SN to stop providing user data to the UE and, if applicable, to start data forwarding.

The MN triggers the UE to apply the new configuration. The MN indicates to the UE the new configuration in the RRCConnectionReconfiguration message including the NR RRC configuration message generated by the target SN. The UE applies the new configuration and sends the RRCConnectionReconfigurationComplete message, including the encoded NR RRC response message for the target SN. In case the UE is unable to comply with (part of) the configuration included in the RRCConnectionReconfiguration message, it performs the reconfiguration failure procedure.

If the RRC connection reconfiguration procedure was successful, the MN informs the target SN via SgNBReconfigurationComplete message with the encoded NR RRC response message for the target SN.

The UE synchronizes to the target SN.

If applicable, data forwarding from the source SN takes place. It may be initiated as early as the source SN receives the SgNB Release Request message from the MN.

If one of the bearer contexts was configured with the SCG or SCG split bearer option at the source SN, path update is triggered by the MN.

Upon reception of the UE Context Release message, the source SN can release radio and C-plane related resource associated to the UE context. Any ongoing data forwarding may continue.

According to embodiments herein the S-SN, upon getting the message, refrains from performing any SCG reconfigurations or initiating any SN triggered procedures.

Figure 8:
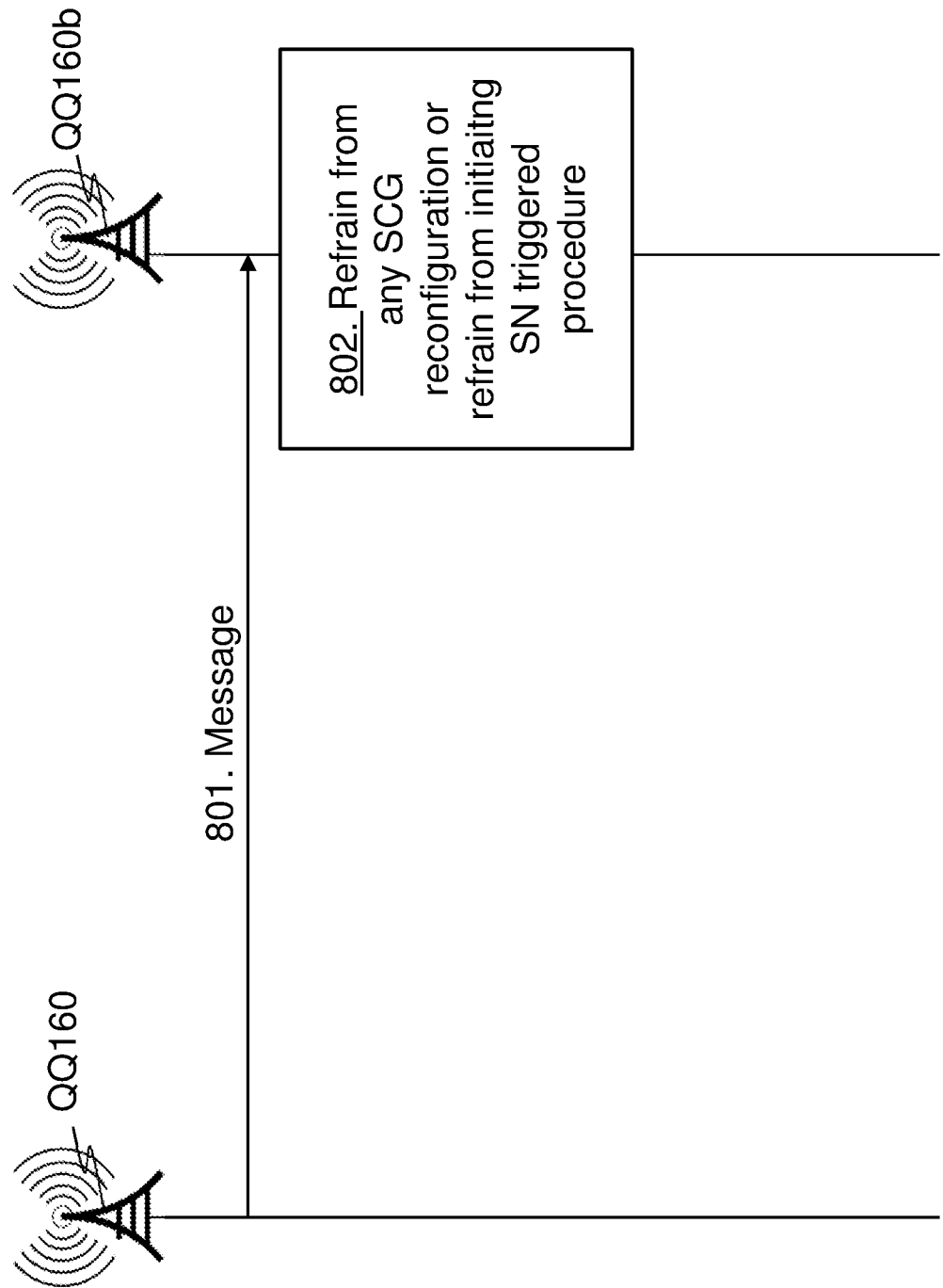
FIG. 8 shows a combined signalling scheme and flowchart according to embodiments herein.

FIG. 8 is a combined signalling scheme and flowchart depicting embodiments herein.

Action 801. The master node QQ160, may also be via the target secondary node, transmits the message to the secondary node QQ160b i.e. source SN, which message indicating an SN change is pending and as such the SN should not perform either SCG reconfigurations or trigger any procedures such as SN initiated SCG change/release.

Action 802. The secondary node QQ160b, upon getting the message, refrains from performing any SCG reconfiguration or initiating SN triggered procedures.

Figure 9:
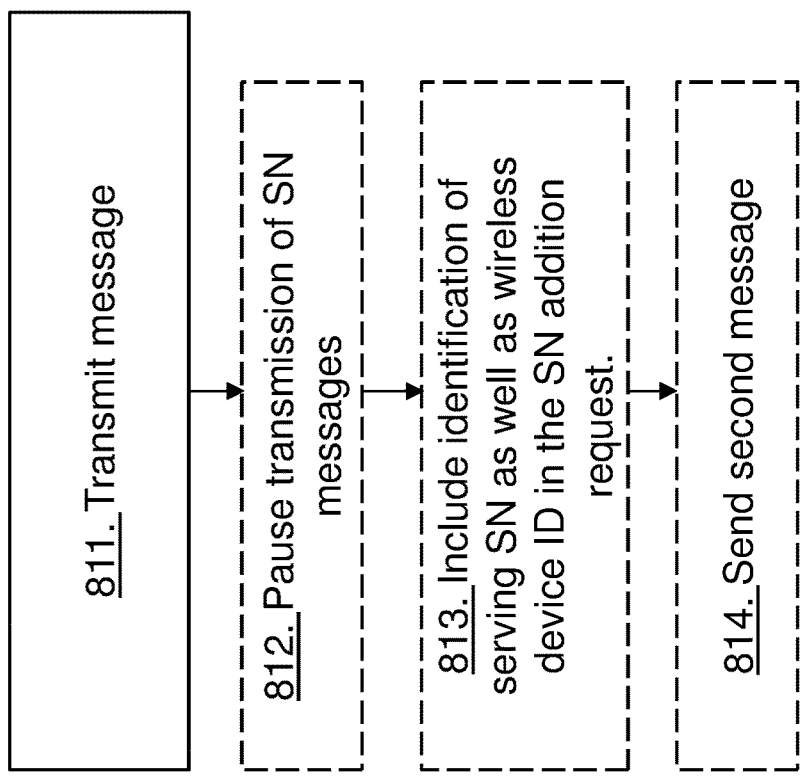
FIG. 9 shows a flowchart depicting a method according to embodiments herein.

The method actions performed by the master node QQ160 for handling communication of the wireless device QQ110 in the wireless network according to embodiments herein will now be described with reference to a flowchart depicted in FIG. 9. The actions do not have to be taken in the order stated below, but may be taken in any suitable order. Actions performed in some embodiments are marked with dashed boxes.

Action 811. The master node QQ160 transmits, to the SN e.g. the S-SN or via the T-SN, the message before initiating a SN change procedure, which message indicates that an SN change is pending and as such the SN should not perform either SCG reconfiguration or trigger any SN triggered procedures. SN triggered procedures may comprise an SN initiated SCG change and/or an SN initiated SCG release. The message may be an X2AP SCG configuration fetch message or a message triggering an X2AP SCG configuration retrieve message, e.g. SgNB Addition request. The master node QQ160 may support a first radio access technology (RAT) and the secondary node may support a second RAT, wherein the first and second RATs are different.

Action 812. The master node QQ160 may pause the transmission of any pending SN messages that were supposed to or being transmitted via embedded SRB.

Action 813. The master node QQ160 may, upon initiating an SN addition request to a target SN, include an identification of a serving SN as well as a wireless device identity (ID) in the SN addition request.

Action 814. The master node QQ160 may, upon finding that the SN addition procedure with the target SN didn't succeed, send a second message to the SN i.e. the source secondary node, indicating that the SN is now able to perform SCG reconfigurations or trigger SN initiated procedures. I.e. the MN QQ160 may, upon finding that the SN addition procedure with the target SN has not succeeded, not release the SN, and in case the MN QQ160 finds or determines that the SN addition procedure with the target SN has succeeded, the MN QQ160 may release the (source) SN.

Furthermore, the MN QQ160 may buffer UL messages sent via embedded RRC. The MN QQ160 may inform the wireless device QQ110 to pause/buffer the processing of UL/DL SN messages when it starts the addition of the target SN. The MN QQ160 may, upon deciding not to release the SN QQ160b, start the transmission of any buffered transmission of SN messages that were planned to be transmitted via embedded SRB (both in UL and DL directions). The MN QQ160 may, upon deciding to release the SN QQ160b, flush all the buffered transmission of SN messages. It should further be noted that a reconfiguration message or SN message refers to an RRC packet, or a PDCP packet comprising an RRC packet, or a lower layer packet (RLC, MAC) that contains parts of a PDCP packet that comprises an RRC packet. A reconfiguration message may be any SN RRC message.

Figure 10:
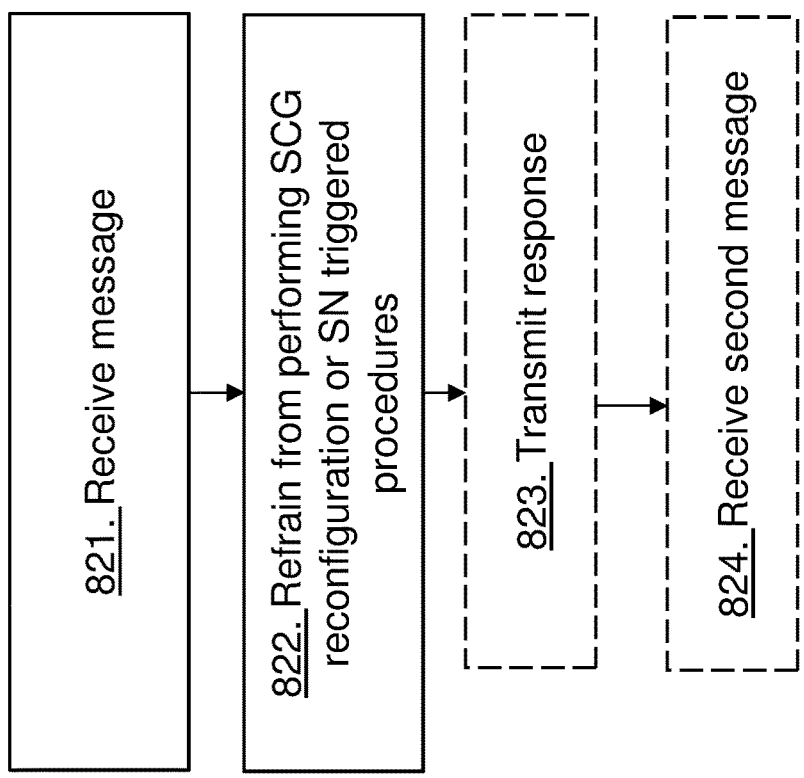
FIG. 10 shows a flowchart depicting a method according to embodiments herein.

The method actions performed by the SN QQ160b for handling communication of the wireless device QQ110 in the wireless network according to embodiments herein will now be described with reference to a flowchart depicted in FIG. 10. The actions do not have to be taken in the order stated below, but may be taken in any suitable order. Actions performed in some embodiments are marked with dashed boxes.

Action 821. The SN QQ160b receives the message from the MN QQ160 or another SN such as the T-SN, wherein the message indicates that a SN change is pending and as such the SN QQ160b should not perform either SCG reconfiguration or trigger any SN triggered procedures. The message may be an X2AP SCG configuration fetch message or an X2AP SCG configuration retrieve message. The message may comprise a flag, wherein the flag set to true means pause performing SCG reconfiguration or initiating SN triggered procedures, while the flag set to false or the not included means continue performing SCG reconfiguration or initiating SN triggered procedures. SN triggered procedures may comprise an SN initiated SCG change and/or an SN initiated SCG release. The master node may support a first RAT and the secondary node may support a second RAT, wherein the first and second RATs are different.

Action 822. The SN QQ160b, upon receiving the message, refrains from performing a SCG reconfiguration or from initiating SN triggered procedures. Refraining may comprise abandoning and/or deleting the SCG reconfiguration or initiation of SN triggered procedures, refraining may further comprise buffering the SCG reconfiguration or initiation of SN triggered procedures. Furthermore, if the SN QQ160b gets a measurement report from the WD during the time period that it has been instructed not to perform reconfigurations or trigger/perform procedures that affect the WD configuration, the SN QQ160b may delete the received measurement report. If the SN QQ160b gets a measurement report from the WD during the time period that it has been instructed not to perform reconfigurations or trigger/perform procedures that affect the WD configuration, the SN QQ160b may store the received measurement report for later use. The reception time of the measurement report may also be saved along with the report. The SN QQ160b may delete any saved measurement, if a certain time duration elapses. The SN QQ160b may delete any saved measurement, if a new measurement report is received. An SCG SRB may be configured between the wireless device and the SN QQ160b. The SN QQ160b may refrain from SCG reconfigurations that are sent via the SCG SRB. The SN QQ160b may keep sending SCG reconfigurations via embedded SRB, but MN QQ160 may buffer them during the target SN addition procedure. If this procedure fails, then the buffered messages may be forwarded to the wireless device QQ110. In case an SCG SRB is not configured between the wireless device QQ110 and the (source) SN QQ160b, the SN QQ160b may refrain from all SCG reconfigurations (whether they are sent via SCG SRB or by embedded RRC). The SN QQ160b may keep sending SCG reconfigurations via embedded SRB, but MN QQ160 may buffer them during the target SN addition procedure. If this procedure fails, then the buffered messages may be forwarded to the wireless device QQ110.

Action 823. The message may be a message requesting a latest SCG configuration of the wireless device, and further may the SN QQ160b transmit a response to the message comprising the latest SCG configuration to a target secondary node or to the master node.

Action 824. In some embodiments the SN QQ160b may receive the second message from the MN QQ160 indicating that the SN is now able to perform SCG reconfigurations or trigger SN initiated procedures, and upon getting the second message, the SN QQ160b may start performing any SCG connection reconfigurations or trigger/perform procedures that affect the UE configuration. The SN QQ160b may start the transmission of any buffered transmission of SCG reconfiguration message or SN triggered procedures. The SN QQ160b may start the transmission of any buffered transmission of SCG reconfiguration message or SN triggered procedures, only if the duration from the time the reconfiguration message or SN triggered procedure was buffered to the reception of the second message has not elapsed a certain configurable amount or threshold. If the SN QQ160b has a saved measurement report or reports, when it receives the second message, the SN QQ160b may start the SN triggered SN change or SN release procedures, if the measurement report indicates a need for that. The measurement result may be considered only if it is not older than a certain duration. If more than one measurement result is available, only the latest measurement result may be considered.

Figure 11:
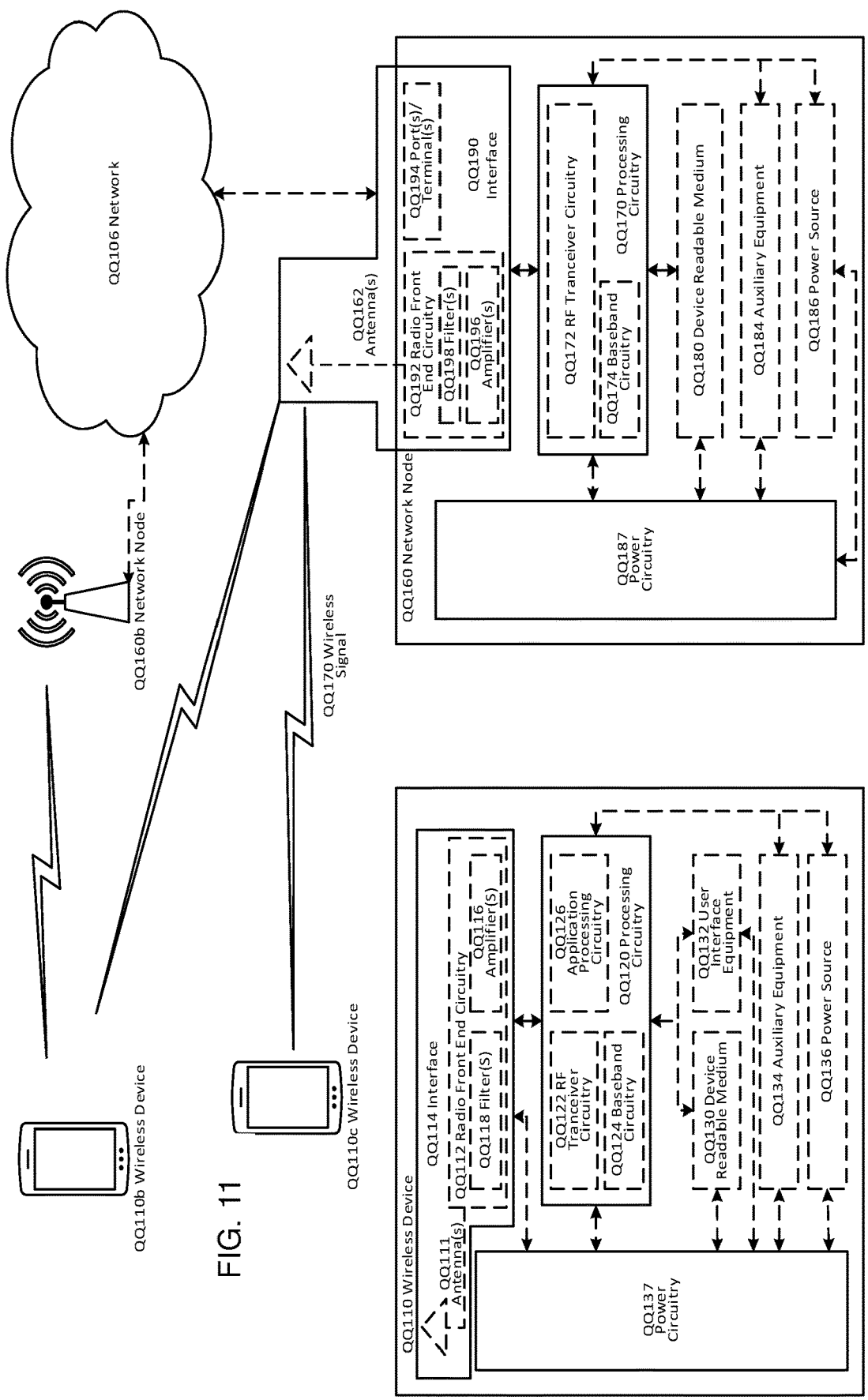
FIG. 11 shows a telecommunication network in accordance with some embodiments.

FIG. 11: A Wireless Network in Accordance with Some Embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 11 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 12:
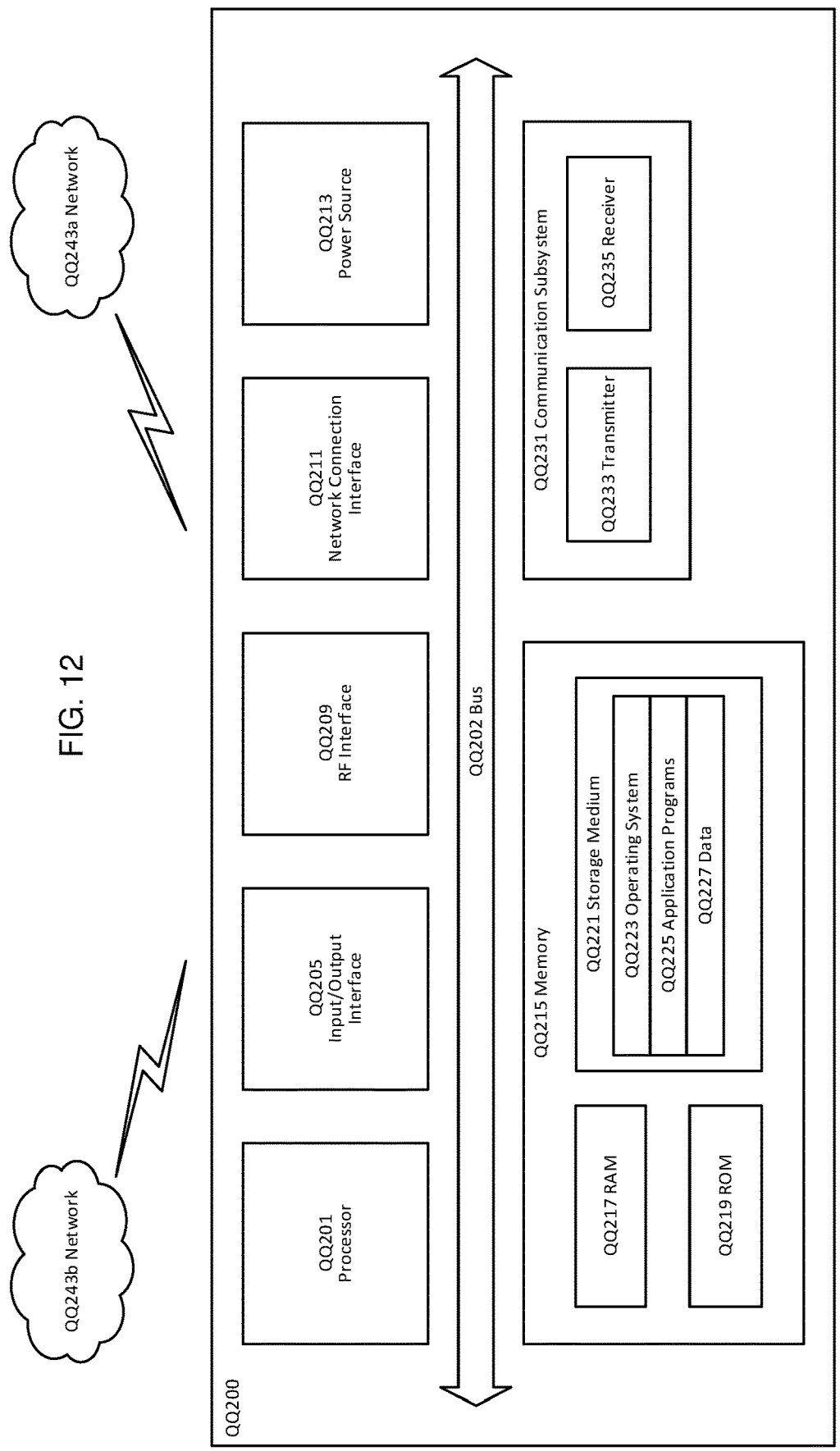
FIG. 12 shows a modular solution in accordance with some embodiments.

FIG. 12: User Equipment in Accordance with Some Embodiments

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3$^{rd}$ Generation Partnership Project (3GPP), including a NB-IoT UE, a machine type communication (MTC) UE, and/or an enhanced MTC (eMTC) UE. UE QQ200, as illustrated in FIG. 12, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 12, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243$b$ may encompass wired and/or wireless networks such as a local-area network (LAN), a wide-area network (WAN), a computer network, a wireless network, a telecommunications network, another like network or any combination thereof. For example, network QQ243$b$ may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 13:
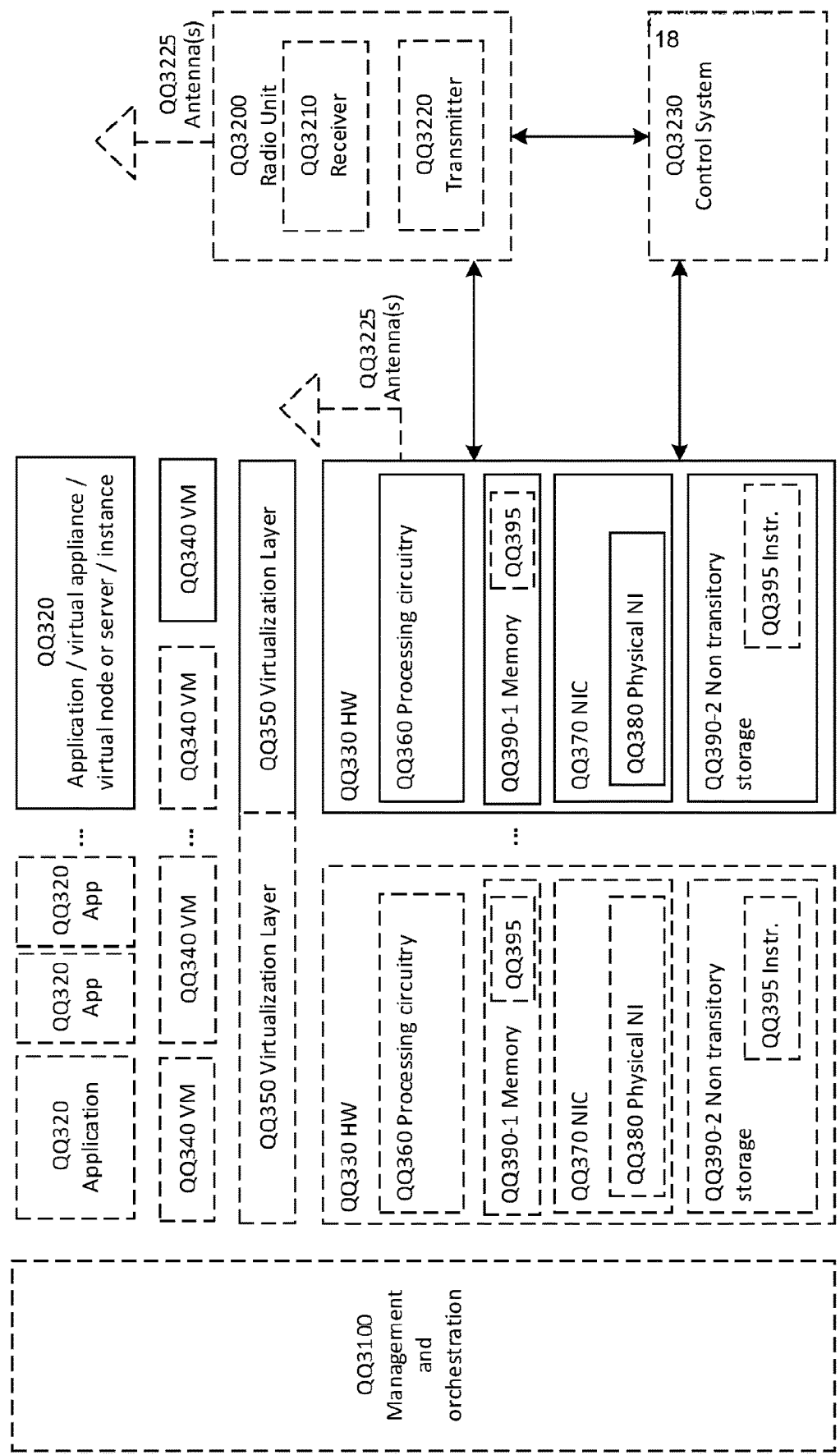
FIG. 13 shows a virtualization environment in accordance with some embodiments.

FIG. 13: Virtualization Environment in Accordance with Some Embodiments

FIG. 13 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware 1330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analogue hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software 1395 and/or instructions executable by processing circuitry QQ360. Software 1395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software 1395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 13, hardware 1330 may be a standalone network node with generic or specific components. Hardware 1330 may comprise antenna QQ3225 and may implement some functions via virtualization. Alternatively, hardware 1330 may be part of a larger cluster of hardware (e.g. such as in a data centre or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centres, and customer premise equipment.

In the context of NFV, virtual machine QQ340 may be a software implementation of a physical machine that runs programs as if they were executing on a physical, non-virtualized machine. Each of virtual machines QQ340, and that part of hardware 1330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure 1330 and corresponds to application QQ320 in FIG. 13.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 14:
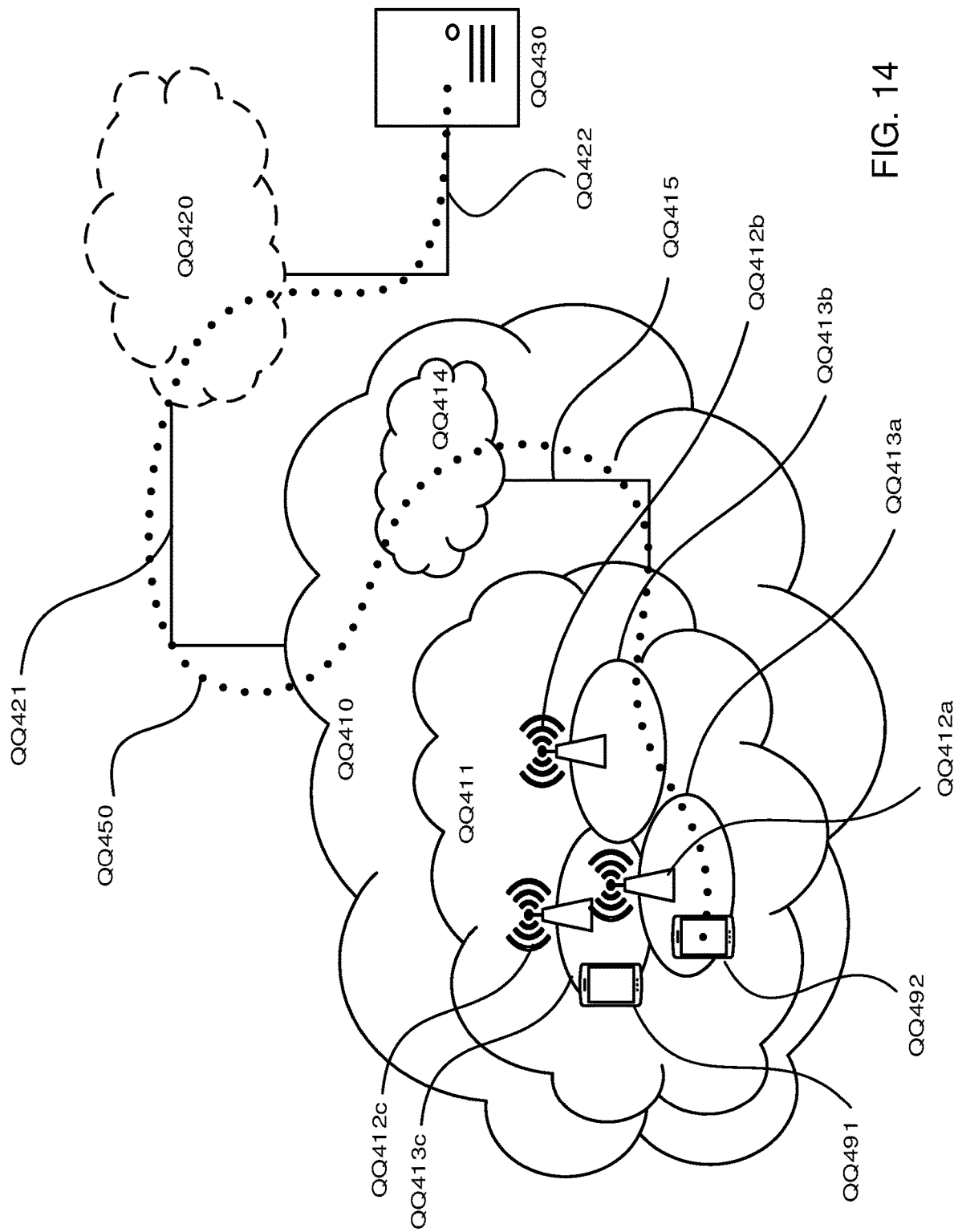
FIG. 14 shows a telecommunication network connected via an intermediate network to a host computer in accordance with some embodiments.

FIG. 14: Telecommunication Network Connected Via an Intermediate Network to a Host Computer in Accordance with Some Embodiments With reference to FIG. 14, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 14 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 15:
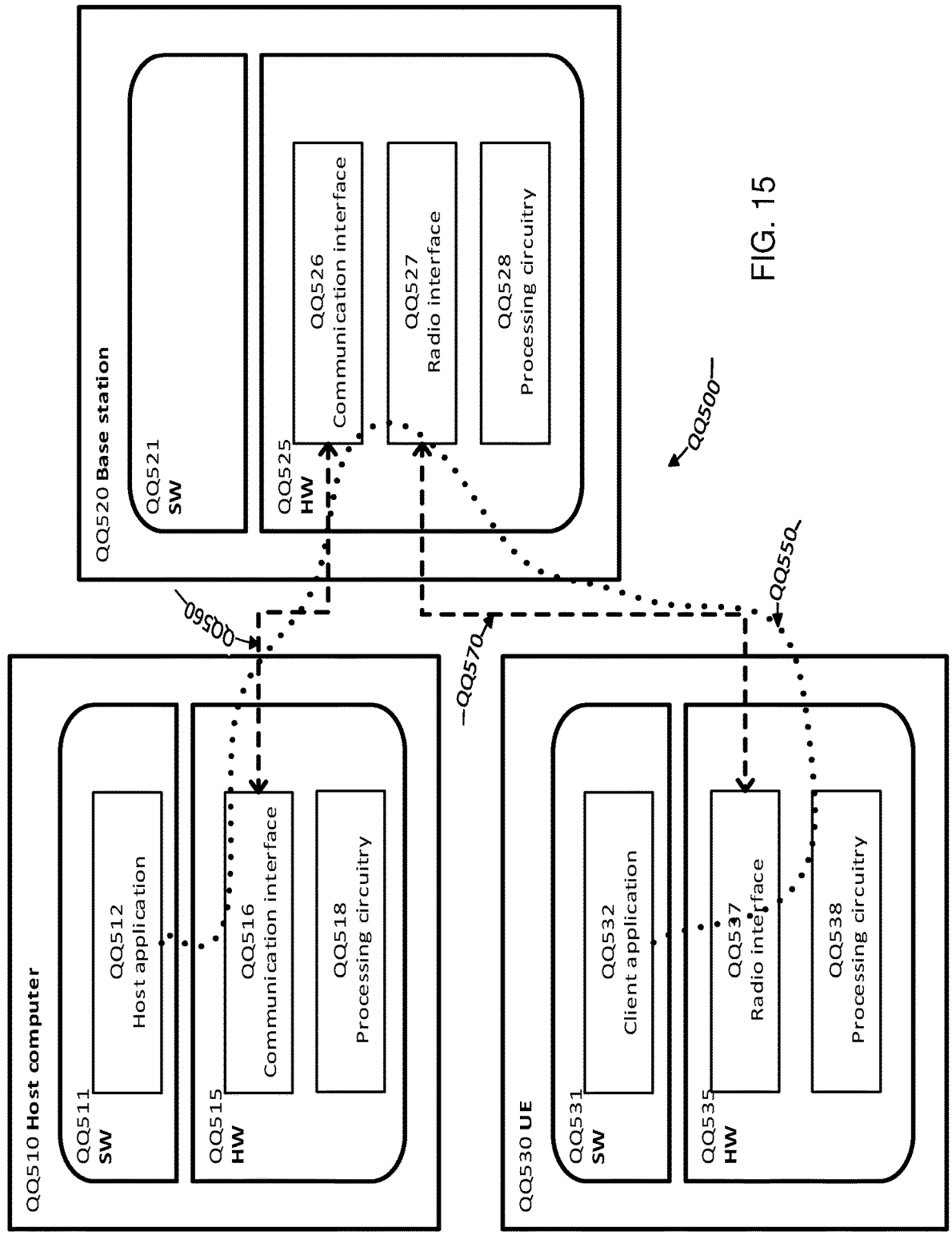
FIG. 15 shows a host computer communicating via a base station with a user equipment over a partially wireless connection in accordance with some embodiments.

FIG. 15: Host Computer Communicating Via a Base Station with a User Equipment Over a Partially Wireless Connection in Accordance with Some Embodiments Example implementations, in accordance with an embodiment, of the UE, base station and host computer discussed in the preceding paragraphs will now be described with reference to FIG. 15. In communication system QQ500, host computer QQ510 comprises hardware 1515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software 1511, which is stored in or accessible by host computer QQ510 and executable by processing circuitry QQ518. Software 1511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware 1525 enabling it to communicate with host computer QQ510 and with UE QQ530. Hardware 1525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 15) served by base station QQ520. Communication interface QQ526 may be configured to facilitate connection QQ560 to host computer QQ510. Connection QQ560 may be direct or it may pass through a core network (not shown in FIG. 15) of the telecommunication system and/or through one or more intermediate networks outside the telecommunication system. In the embodiment shown, hardware 1525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software 1521 stored internally or accessible via an external connection.

Communication system QQ500 further includes UE QQ530 already referred to. It's hardware 1535 may include radio interface QQ537 configured to set up and maintain wireless connection QQ570 with a base station serving a coverage area in which UE QQ530 is currently located. Hardware 1535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software 1531, which is stored in or accessible by UE QQ530 and executable by processing circuitry QQ538. Software 1531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 15 may be similar or identical to host computer QQ430, one of base stations QQ412a, QQ412b, QQ412c and one of UEs QQ491, QQ492 of FIG. 14, respectively. This is to say, the inner workings of these entities may be as shown in FIG. 15 and independently, the surrounding network topology may be that of FIG. 14.

In FIG. 15, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the latency as the SCG configuration of the UE is different at the target SN and the UE and thereby provide benefits such as reduced waiting time and better responsiveness.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software 1511 and hardware 1515 of host computer QQ510 or in software 1531 and hardware 1535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software 1511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software 1511 and QQ531 causes messages to be transmitted, in particular empty or 'dummy' messages, using OTT connection QQ550 while it monitors propagation times, errors etc.

Figure 16:
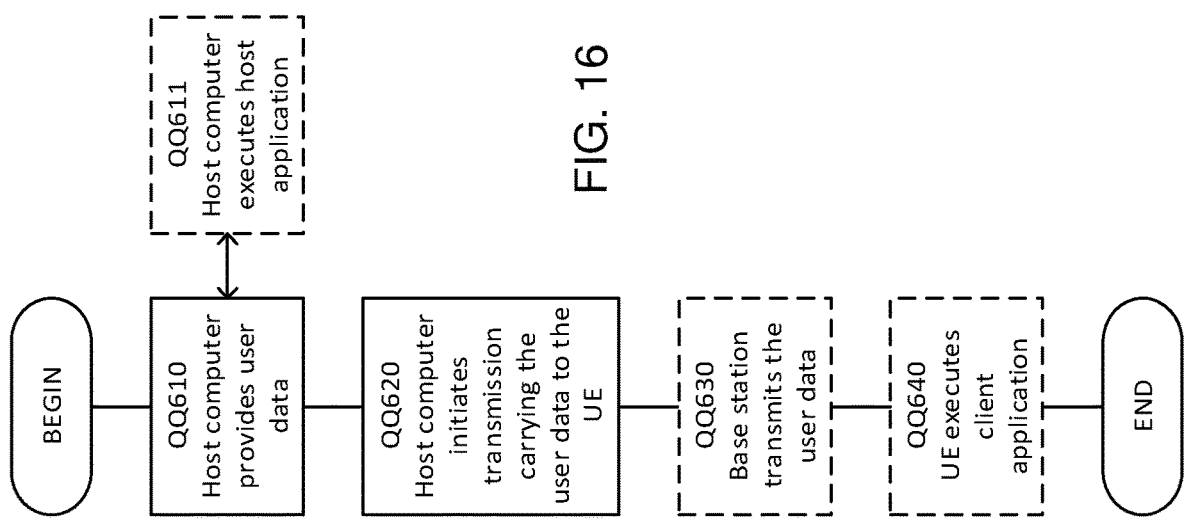
FIG. 16 shows methods implemented in a communication system including a host computer, a base station and a user equipment in accordance with some embodiments.

FIG. 16: Methods Implemented in a Communication System Including a Host Computer, a Base Station and a User Equipment in Accordance with Some Embodiments FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 17:
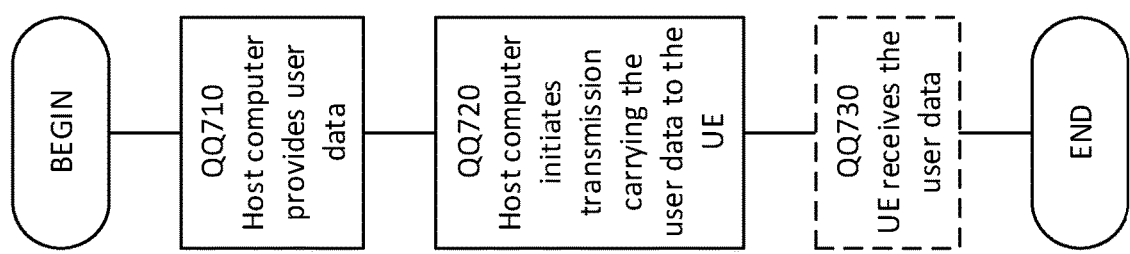
FIG. 17 shows methods implemented in a communication system including a host computer, a base station and a user equipment in accordance with some embodiments.

FIG. 17: Methods Implemented in a Communication System Including a Host Computer, a Base Station and a User Equipment in Accordance with Some Embodiments FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 18:
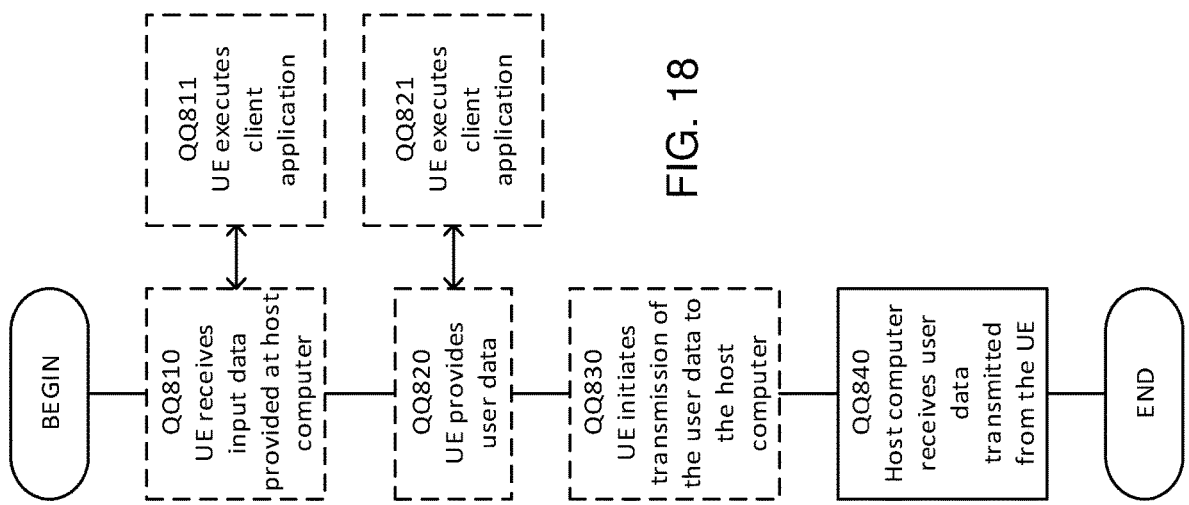
FIG. 18 shows methods implemented in a communication system including a host computer, a base station and a user equipment in accordance with some embodiments.

FIG. 18: Methods Implemented in a Communication System Including a Host Computer, a Base Station and a User Equipment in Accordance with Some Embodiments FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 19:
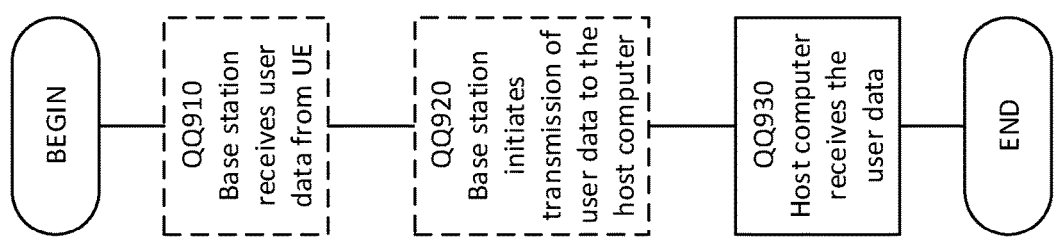
FIG. 19 shows methods implemented in a communication system including a host computer, a base station and a user equipment in accordance with some embodiments.

FIG. 19: Methods Implemented in a Communication System Including a Host Computer, a Base Station and a User Equipment in Accordance with Some Embodiments FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

FIG. 20: Method in Accordance with Some Embodiments

FIG. 20 depicts a method in accordance with particular embodiments, the method begins at step W02 with the master node transmitting, to the secondary node (SN), the message before initiating a SN change procedure, which message indicates that an SN change is pending and as such the SN should not perform either SCG reconfigurations or trigger any SN triggered procedures.

Figure 21:
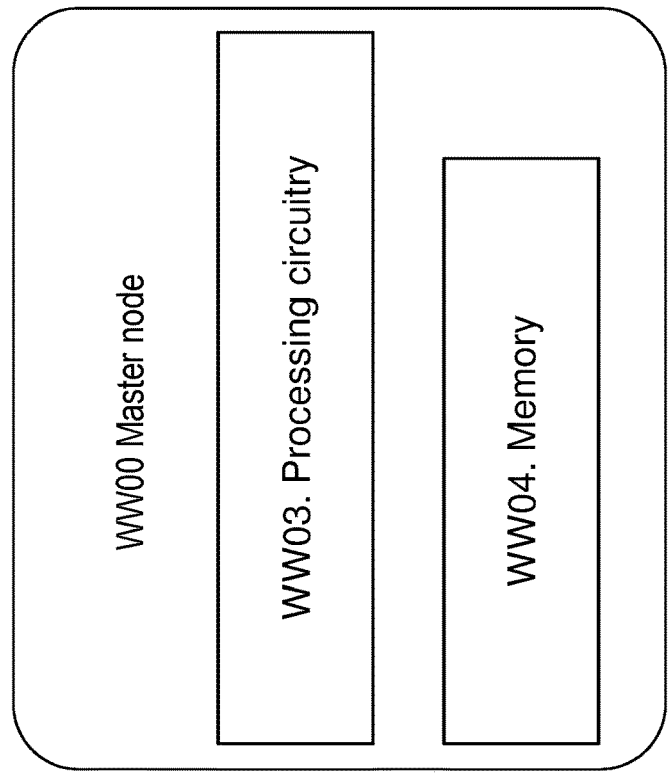
FIG. 21 is a block diagram depicting a master node according to some embodiments herein.
Figure 21:
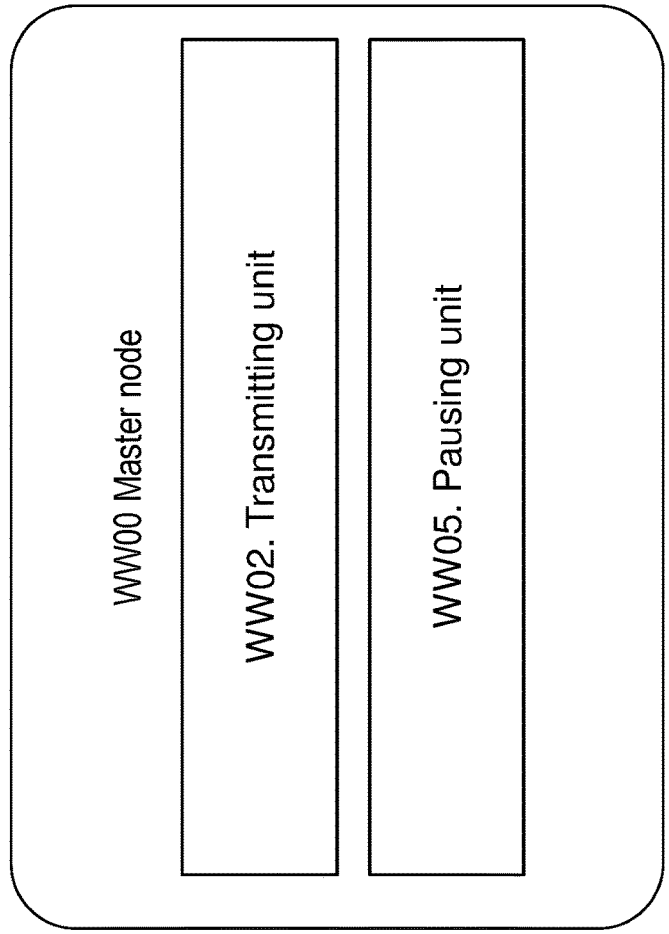

FIG. 21: Virtualization Apparatus in Accordance with Some Embodiments

FIG. 21 illustrates a schematic block diagram of an apparatus WW00 in a wireless network (for example, the wireless network shown in FIG. 11). The apparatus may be implemented in a network node, i.e. a master node, (e.g., network node QQ160 shown in FIG. 11). Apparatus WW00 is operable to carry out the example method described with reference to FIG. 20 and possibly any other processes or methods disclosed herein. It is also to be understood that the method of FIG. 20 is not necessarily carried out solely by apparatus WW00. At least some operations of the method can be performed by one or more other entities.

Virtual Apparatus WW00 may comprise processing circuitry WW03, which may include one or more microprocessor or microcontrollers, as well as other digital hardware, which may include digital signal processors (DSPs), special-purpose digital logic, and the like. The processing circuitry may be configured to execute program code stored in memory WW04, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit WW02 and any other suitable units of apparatus WW00 to perform corresponding functions according one or more embodiments of the present disclosure.

As illustrated in FIG. 21, apparatus WW00 includes the transmitting unit WW02. The transmitting unit WW02, such as a transmitter or transceiver is configured to transmit the message before initiating a SN change procedure, which message indicates that an SN change is pending. It is herein described the master node QQ160 for handling communication of the wireless device QQ110 in the wireless network. The transmitting unit WW02, the processing circuitry and/or the MN is configured to transmit, to the SN, the message before initiating a SN change procedure, which message indicates that an SN change is pending and as such the SN should not perform either a SCG reconfiguration or trigger any SN triggered procedures. The master node QQ160, the processing circuitry and/or a pausing unit WW05 may further be configured to pause the transmission of any pending SN messages that were supposed to or being transmitted via embedded SRB. The transmitting unit WW02, the processing circuitry and/or the MN may be configured to, upon initiating an SN addition request to a target SN, include an identification of a serving SN as well as a wireless device ID in the SN addition request. SN triggered procedures may comprise an SN initiated SCG change and/or an SN initiated SCG release. The message may be an X2AP SCG configuration fetch message or the message triggering an X2AP SCG configuration retrieve message. The master node may be configured to support a first radio access technology, RAT, and the secondary node is configured to support a second RAT, wherein the first and second RATs are different.

Figure 22:
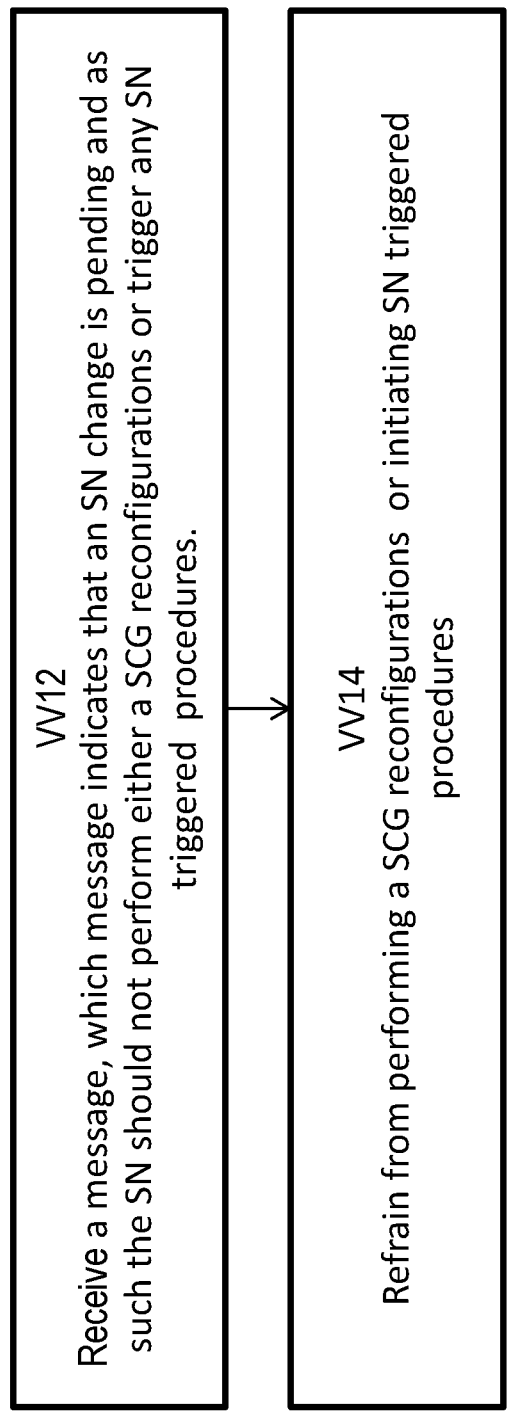
FIG. 22 is a block diagram depicting a method performed by the secondary node according to some embodiments herein.

FIG. 22: Method in Accordance with Some Embodiments

FIG. 22 depicts a method in accordance with particular embodiments, the method begins at step W12 with the secondary node receiving, from the master node, the message, which message indicates that an SN change is pending and as such the SN should not perform either SCG reconfigurations or trigger any SN triggered procedures. Step W14: the SN refrains, upon receiving the message, from performing SCG reconfigurations or initiating SN triggered procedures.

Figure 23:
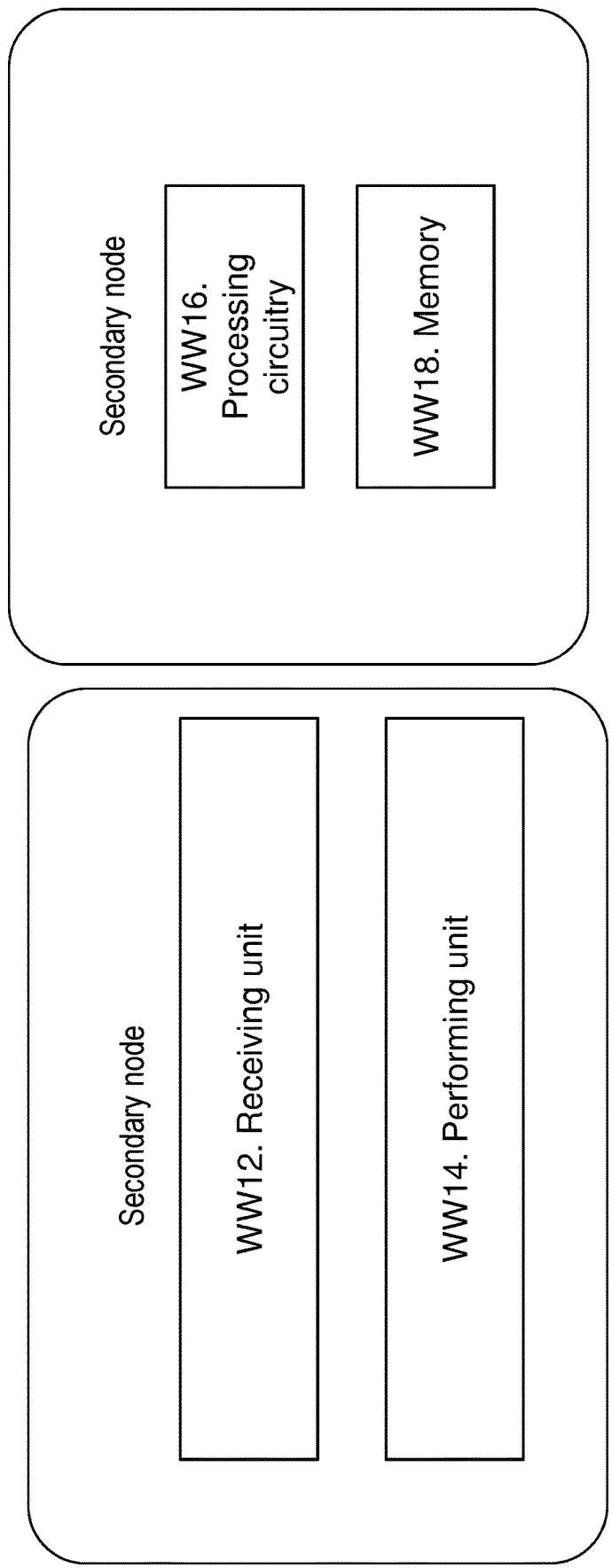
FIG. 23 is a block diagram depicting a secondary node according to some embodiments herein.

FIG. 23: Virtualization Apparatus in Accordance with Some Embodiments

FIG. 23 illustrates a schematic block diagram of an apparatus such as the network node QQ160b in a wireless network (for example, the wireless network shown in FIG. 11). The apparatus may be implemented in a network node, i.e. a secondary node, (e.g., network node QQ160b shown in FIG. 11). Apparatus is operable to carry out the example method described with reference to FIG. 22 and possibly any other processes or methods disclosed herein. It is also to be understood that the method of FIG. 22 is not necessarily carried out solely by apparatus. At least some operations of the method can be performed by one or more other entities.

Virtual Apparatus may comprise processing circuitry WW16, which may include one or more microprocessor or microcontrollers, as well as other digital hardware, which may include digital signal processors (DSPs), special-purpose digital logic, and the like. The processing circuitry may be configured to execute program code stored in memory WW18, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the receiving unit WW12 and performing unit WW14 and any other suitable units of apparatus to perform corresponding functions according one or more embodiments of the present disclosure.

As illustrated in FIG. 23, apparatus includes the receiving unit WW12 and the performing unit WW14. The receiving unit WW12, such as a receiver or transceiver is configured to receive the message, which message indicates that an SN change is pending. The performing unit WW14 is configured to, upon receiving the message, refrain from performing SCG reconfigurations or initiating SN triggered procedures. Thus, the processing circuitry, the secondary node or the receiving/performing unit for handling communication of the wireless device QQ110 in the wireless network is configured to receive a message from the master node or another SN, wherein the message indicates that a SN change is pending and as such the SN should not perform either a secondary cell group, SCG, reconfiguration or trigger any SN triggered procedures. The processing circuitry, the secondary node or the performing unit is further configured to, upon receiving the message, refrain from performing a SCG reconfiguration or initiating SN triggered procedures. The message may be an X2AP SCG configuration fetch message or an X2AP SCG configuration retrieve message. The message may comprise a flag, wherein the flag set to true means pause performing a SCG reconfiguration or paus initiating SN triggered procedures, while the flag set to false or the not included means continue performing the SCG reconfiguration or initiating SN triggered procedures. The SN triggered procedures comprise an SN initiated SCG change and/or an SN initiated SCG release. The message may be a message requesting a latest SCG configuration of the wireless device, and the processing circuitry, the secondary node or the performing unit may further be configured to transmit a response to the message comprising the latest SCG configuration to a target secondary node or the master node. The processing circuitry, the secondary node or the performing unit is configured to support a second radio access technology, RAT, and the master node may be configured to support a second RAT, wherein the first and second RATs are different.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1×Radio Transmission Technology
3GPP 3rd Generation Partnership Project
5G 5th Generation
ABS Almost Blank Subframe
ACK Acknowledgement
AP Application Protocol
ARQ Automatic Repeat Request
AWGN Additive White Gaussian Noise
BCCH Broadcast Control Channel
BCH Broadcast Channel
BSR Buffer Status Report
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CE Control Element
CP Control Plane
DC Dual Connectivity DCI Downlink Control Information
DL Downlink
DRB Data Radio Bearer
eNB (EUTRAN) base station
E-RAB EUTRAN Radio Access Bearer
FDD Frequency Division Duplex
gNB NR base station
GTP-U GPRS Tunneling Protocol-User Plane
IP Internet Protocol
LTE Long Term Evolution
MCG Master Cell Group
MAC Medium Access Control
MeNB Master eNB
MgNB Master gNB
MN Master Node
NACK Negative Acknowledgement
NR New Radio
PDCP Packet Data Convergence Protocol
PUSCH Physical Uplink Shared Channel
RLC Radio Link Control
RLF Radio Link Failure
RRC Radio Resource Control
SCG Secondary Cell Group
SCTP Stream Control Transmission Protocol
SeNB Secondary gNB
S-SgNB Source Secondary gNB
SgNB Secondary gNB
SN Secondary Node
S-SN Source Secondary Node
SR Scheduling Request
SRB Signaling Radio Bearer
TDD Time Division Duplex
TEID Tunnel Endpoint IDentifier
TNL Transport Network Layer
T-SgNB Target Secondary gNB
T-SN Target Secondary Node
UCI Uplink Control Information
UDP User Datagram Protocol
UE User Equipment
UL Uplink
UP User Plane
URLLC Ultra Reliable Low Latency Communication
X2 Interface between base stations

The invention claimed is:

1. A method performed by a master node for handling communication of a wireless device in a wireless network, the method comprising:
    transmitting, to a secondary node, SN, a message before initiating a SN change procedure, which message indicates that an SN change is pending and as such the SN should not perform either a secondary cell group, SCG, reconfiguration or trigger any SN triggered procedures;
    pausing the transmission of any pending SN messages that were one of supposed to and are being transmitted via embedded signalling radio bearer, SRB;
    saving the paused messages in a buffer; and
    upon deciding to release the SN, starting transmission of the buffered messages.

2. The method according to claim 1, wherein the master node, upon initiating an SN addition request to a target SN, includes an identification of a serving SN as well as a wireless device identity, ID, in the SN addition request.

3. The method according to claim 1, wherein SN triggered procedures comprise at least one of an SN initiated SCG change and an SN initiated SCG release.

4. The method according to claim 1, wherein the message is one of an X2AP SCG configuration fetch message and a message triggering an X2AP SCG configuration retrieve message.

5. A method performed by a secondary node, SN, for handling communication of a wireless device in a wireless network, the method comprising:
    receiving a message from one of a master node and another SN, the message indicating that a SN change is pending and as such the SN should not perform either a secondary cell group, SCG, reconfiguration or trigger any SN triggered procedures;
    upon receiving the message, refraining from performing SCG reconfigurations or initiating SN triggered procedures and buffering any SCG reconfigurations or SN triggered procedures performed or initiated; and
    if a threshold amount of time has passed, performing any buffered SCG reconfigurations and initiating any buffered SN triggered procedures.

6. The method according to claim 5, wherein the message is one of an X2AP SCG configuration fetch message and an X2AP SCG configuration retrieve message.

7. The method according to claim 5, wherein the message is configurable to comprise a flag, wherein the flag, when included in the message and set to true, means that the SN is to pause performing a SCG reconfiguration or initiating SN triggered procedures, and wherein the flag, when one of either not included in the message and included in the message but set to false, means that the SN is to continue performing the SCG reconfiguration or initiating SN triggered procedures.

8. The method according to claim 5, wherein SN triggered procedures comprise at least one of an SN initiated SCG change and an SN initiated SCG release.

9. The method according to claim 5, wherein the message is a message requesting a latest SCG configuration of the wireless device, and wherein the method further comprises transmitting a response to the message comprising the latest SCG configuration to one of a target secondary node and the master node.

10. A master node for handling communication of a wireless device in a wireless network, wherein the master node comprises:
    processing circuitry configured to transmit, to a secondary node, SN, a message before initiating a SN change procedure, which message indicates that an SN change is pending and as such the SN should not perform either a secondary cell group, SCG, reconfiguration or trigger any SN triggered procedures;
    pause the transmission of any pending SN messages that were one of supposed to and are being transmitted via embedded signalling radio bearer, SRB;
    save the paused messages in a buffer; and
    upon deciding to release the SN, start transmission of the buffered messages.

11. The master node according to claim 10, wherein the processing circuitry, upon initiating an SN addition request to a target SN, is configured to include an identification of a serving SN as well as a wireless device identity, ID, in the SN addition request.

12. The master node according to claim 10, wherein SN triggered procedures comprise at least one of an SN initiated SCG change and an SN initiated SCG release.

13. The master node according to claim 10, wherein the message is one of an X2AP SCG configuration fetch message and a message triggering an X2AP SCG configuration retrieve message.

14. A secondary node, SN, for handling communication of a wireless device in a wireless network, wherein the SN comprises:
  processing circuitry configured to:
    receive a message from one of a master node and another SN, the message indicating that a SN change is pending and as such the SN should not perform either a secondary cell group, SCG, reconfiguration or trigger any SN triggered procedures;
    upon receiving the message, refrain from performing a SCG reconfiguration or initiating SN triggered procedures and buffer any SCG reconfigurations or SN triggered procedures not performed or initiated; and
    if a threshold amount of time has passed, perform any buffered SCG reconfigurations and initiate any buffered SN triggered procedures.

15. The SN according to claim 14, wherein the message is one of an X2AP SCG configuration fetch message and an X2AP SCG configuration retrieve message.

16. The SN according to claim 14, wherein the message is configurable to comprise a flag, wherein the flag, when included in the message and set to true, means that the SN is to pause performing a SCG reconfiguration or initiating SN triggered procedures, and wherein the flag, when one of either not included in the message and included in the message but set to false, means that the SN is to continue performing the SCG reconfiguration or initiating SN triggered procedures.

17. The SN according to claim 14, wherein SN triggered procedures comprise at least one of an SN initiated SCG change and an SN initiated SCG release.

18. The SN according to claim 14, wherein the message is a message requesting a latest SCG configuration of the wireless device, and the processing circuitry is further configured to transmit a response to the message comprising the latest SCG configuration to a target secondary node or the master node.

* * * * *